US011815356B2

(12) United States Patent
Scherzinger

(10) Patent No.: US 11,815,356 B2
(45) Date of Patent: Nov. 14, 2023

(54) RANGE IMAGE AIDED INS

(71) Applicant: Trimble Inc., Sunnyvale, CA (US)

(72) Inventor: Bruno M. Scherzinger, Ontario (CA)

(73) Assignee: Trimble Inc., Sunnyvale, CA (US)

( * ) Notice: Subject to any disclaimer, the term of this patent is extended or adjusted under 35 U.S.C. 154(b) by 369 days.

(21) Appl. No.: 17/178,620

(22) Filed: Feb. 18, 2021

(65) Prior Publication Data

US 2022/0276053 A1 Sep. 1, 2022

(51) Int. Cl.
*G01C 21/16* (2006.01)
*G01C 19/02* (2006.01)

(52) U.S. Cl.
CPC ......... *G01C 21/1652* (2020.08); *G01C 19/02* (2013.01); *G01C 21/1656* (2020.08)

(58) Field of Classification Search
CPC . G01C 21/1652; G01C 19/02; G01C 21/1656
USPC ....................................... 701/501
See application file for complete search history.

(56) References Cited

U.S. PATENT DOCUMENTS

| 4,445,376 | A | 5/1984 | Merhav |
| 8,676,498 | B2* | 3/2014 | Ma ................. G05D 1/027 353/30 |
| 11,243,081 | B2 | 2/2022 | Lambert et al. |
| 2018/0112985 | A1* | 4/2018 | Madison ............. G06V 10/462 |
| 2020/0309529 | A1 | 10/2020 | Lambert et al. |
| 2023/0211840 | A1 | 7/2023 | Lambert et al. |

FOREIGN PATENT DOCUMENTS

| CN | 113008229 A | 6/2021 |
| GB | 2146124 A | 4/1985 |
| JP | 2012119901 A * | 6/2012 |

OTHER PUBLICATIONS

Benson, Jr., D., "A Comparison of Two Approaches to Pure-Inertial and Doppler-Inertial Error Analysis," IEEE Transactions on Aerospace and Electronic Systems, vol. AES-11, No. 4, Jul. 1975, pp. 447-455.

(Continued)

*Primary Examiner* — Isaac G Smith
(74) *Attorney, Agent, or Firm* — KILPATRICK TOWNSEND & STOCKTON LLP

(57) ABSTRACT

A navigation system includes an IMU, a navigation estimator configured to estimate a current navigation solution based on (i) a last navigation solution, and (ii) a specific force vector and a n angular rate vector measured by the IMU, an RI sensor, an RI data preprocessor configured to: perform a priori transformations of last RI data and current RI data to obtain transformed last RI data and transformed current RI data based on the last navigation solution and the current navigation solution, respectively, an RI filter manager (RFM) configured to construct a delta pose registration cost gradient (DPRCG) measurement based on (i) the transformed last RI data, (ii) the transformed current RI data, (iii) the current navigation solution, and (iv) the last navigation solution. The navigation estimator is further configured to determine an absolute navigation solution based on at least (i) the current navigation solution, and (ii) the DPRCG measurement.

20 Claims, 12 Drawing Sheets

(56) References Cited

OTHER PUBLICATIONS

Chen, Y. et al., "Object Modeling by Registration of Multiple Range Images," Proceedings of the 1991 IEEE, International Conference on Robotics and Automation, Sacramento, California, Apr. 1991, pp. 2724-2729.

Gao, Y. et al., "INS/GPS/LiDAR Integrated Navigation System for Urban and Indoor Environments Using Hybrid Scan Matching Algorithm," Sensors, 15, Published Sep. 15, 2015, pp. 23286-23302.

Scherzinger, B., "Inertial Navigator Error Models for Large Heading Uncertainty," IEEE, 1996, pp. 477-484.

Scherzinger, B. et al., "Modified Strapdown Inertial Navigator Error Models," IEEE, 1994, pp. 426-430.

Shan, T. et al., "LIO-SAM: Tightly-coupled Lidar Inertial Odometry via Smoothing and Mapping," IEEE/RSJ International Conference on Intelligent Robots and Systems, Jul. 7, 2020, 9 pages.

Extended European Search Report for Application No. 22157394.2-1009, dated Jul. 5, 2022, 14 pages.

Schmid, K. et al., "Stereo Vision and IMU Based Real-Time Ego-Motion and Depth Image Computation on a Handheld Device," 2013 IEEE International Conference on Robotics and Automation (ICRA); May 6, 2013, pp. 4671-4678.

Roumeliotis, S. I. et al., "Stochastic Cloning: A Generalized Framework for Processing Relative State Measurements," Proceedings 2002 IEEE International Conference on Robotics and Automation, May 11-15, vol. 2, pp. 1788-1795.

Mohamed, S. et al., "A Survey on Odometry for Autonomous Navigation Systems," IEEE Access, vol. 7, Aug. 6, 2019, pp. 97466-97486.

Liu, S. et al., "LiDAR-aided Integrated INS/GPS Navigation System for Unmanned Ground Vehicles in Urban and Indoor Environments Using Hybrid Adaptive Scan Matching Algorithm," GNSS 2015—Proceedings of the $28^{th}$ International Technical Meeting of the Satellite Division of the Institute of Navigation, Sep. 18, 2015, pp. 2311-2318.

U.S. Appl. No. 17/178,624 Non-Final Office Action dated Jul. 20, 2023, 10 pages.

* cited by examiner

RANGE IMAGE AIDED INS

CROSS-REFERENCES TO RELATED APPLICATIONS

The following two U.S. Patent Applications (including this one) are being filed concurrently, and the entire disclosure of the other application is incorporated by reference into this application for all purposes:

Application Ser. No. 17/178,620, filed Feb. 18, 2021, entitled "RANGE IMAGE AIDED INS", and Application Ser. No. 17/178,624, filed Feb. 18, 2021, entitled "RANGE IMAGE AIDED INS WITH MAP BASED LOCALIZATION".

BACKGROUND

An inertial navigation system (INS) is a navigation device that uses motion sensors and rotation sensors to continuously calculate the pose and the velocity of a moving object. The term "pose" may refer to the position and orientation of the object. The term "velocity" may refer to the speed and direction of movement of the object. The motion sensors and rotation sensors may be referred to as an inertial measure unit (IMU). The IMU can include a three-axis accelerometer and a three-axis gyroscope attached to the object, for measuring its specific forces (linear accelerations plus gravitational force and Coriolis force) along three orthogonal axes and its angular rates around three orthogonal rotational axes, respectively. The INS can calculate a solution of the current position and the current orientation of the object by using a previous solution and advancing the previous solution based on integrating estimated velocities (including linear velocity and angular velocity) over elapsed time. This process can be referred to as dead reckoning.

An INS can be subject to integration drift. Small errors in the measurements of accelerations may be integrated into progressively larger errors in velocities, which may be compounded into still greater errors in position and orientation. Since a new solution is calculated from the previous solution and the measured accelerations, these errors approximately accumulate proportionally to the time since the initial solution was input. Therefore, an INS may need additional measurements from external sources to correct its solutions from time to time. Such an INS may be referred to as an aided INS (AINS). The external sources may be referred to as aiding data sources. The aiding data sources can include, for example, global navigation satellite systems (GNSS) receiver, wheel odometer (on a land vehicle), zero velocity detector, Doppler radar or sonar, magnetic compass or magnetometer, range images, and the like.

SUMMARY

According to some embodiments, a navigation system includes an IMU attached to a dynamic platform and configured to measure a specific force vector and an angular rate vector of the dynamic platform, and an INS unit coupled to the IMU. The INS unit is configured to: determine an INS solution of a position and an orientation of the dynamic platform based on at least: (i) a previous INS solution, and (ii) the specific force vector and the angular rate vector measured by the IMU; compute a current INS solution based on the INS solution, the current INS solution being valid at a current construction time; and compute a last INS solution based on a prior INS solution, the last INS solution being valid at a last construction time prior to the current construction time. The navigation system further includes a range image sensor (RI sensor) attached to the dynamic platform and configured to acquire last range image data (RI data) at the last construction time and current RI data at the current construction time, and an RI data preprocessor coupled to the RI sensor and the INS unit, and configured to: perform an a priori transformation of the last RI data using the last INS solution to obtain transformed last RI data; and perform an a priori transformation of the current RI data using the current INS solution to obtain transformed current RI data. The navigation system further includes an RI filter manager (RFM) coupled to the RI data preprocessor and configured to construct a delta pose registration cost gradient (DPRCG) measurement for the current construction time based on the transformed last RI data, the transformed current RI data, the last INS solution, and the current INS solution, and an aided INS (AINS) estimator coupled to the RFM and the INS unit, and configured to determine INS error corrections and INS solution statistics based on the DPRCG measurement. The INS unit is configured to update the INS solution based on the INS error corrections. The navigation system further includes an output manager coupled to the INS unit and the AINS estimator, and configured to determine an absolute solution of a current position and a current orientation of the dynamic platform based on the INS solution and the INS solution statistics.

According to some embodiments, a navigation system includes an IMU attached to a dynamic platform and configured to measure a specific force vector and an angular rate vector of the dynamic platform, and a navigation estimator coupled to the IMU and configured to estimate a current navigation solution of a position and an orientation of the dynamic platform at a current time based on at least: (i) a last navigation solution at a prior time, and (ii) the specific force vector and the angular rate vector measured by the IMU. The navigation system further includes an RI sensor attached to the dynamic platform and configured to acquire current RI data at the current time and last RI data at the prior time, and an RI data preprocessor coupled to the RI sensor and the navigation estimator, and configured to: perform an a priori transformation of the last RI data to obtain transformed last RI data based on the last navigation solution; and perform an a priori transformation of the current RI data to obtain transformed current RI data based on the current navigation solution. The navigation system further includes an RI filter manager (RFM) coupled to the RI data preprocessor and the navigation estimator, and configured to construct a delta pose registration cost gradient (DPRCG) measurement based on (i) the transformed last RI data, (ii) the transformed current RI data, (iii) the current navigation solution, and (iv) the last navigation solution. The navigation estimator is further configured to determine an absolute navigation solution of a current position and a current orientation of the dynamic platform based on at least (i) the current navigation solution, and (ii) the DPRCG measurement.

According to some embodiments, a method of navigation includes measuring, using an IMU attached to a dynamic platform, a specific force vector and an angular rate vector of the dynamic platform, determining an INS solution of a current position and a current orientation of the dynamic platform based on at least: (i) a previous solution, and (ii) the specific force vector and the angular rate vector measured by the IMU, computing a current INS solution based on the INS solution, the current INS solution being valid at a current construction time, computing a last INS solution based on a prior INS solution, the last INS solution being valid at a last construction time prior to the current construction time, acquiring, using an RI sensor attached to the dynamic platform, last RI data at the last construction time and current RI data at the current construction time, performing an a priori transformation of the last RI data using the last INS solution to obtain transformed last RI data, performing an a priori transformation of the current RI data using the current INS solution to obtain transformed current RI data, constructing a delta pose registration cost gradient (DPRCG) measurement for the current construction time based on the transformed last RI data, the transformed current RI data, the last INS solution, and the current INS solution, determining INS error corrections and INS solution statistics based on the DPRCG measurement, updating the INS solution based on the INS error corrections, and determining an absolute solution of the current position and the current orientation of the dynamic platform based on the INS solution and the INS solution statistics.

According to some embodiments, a method of navigation includes measuring, using an IMU attached to a dynamic platform, a specific force vector and an angular rate vector of the dynamic platform, estimating a current navigation solution of a position and an orientation of the dynamic platform at a current time based on at least: (i) a last navigation solution at a prior time, and (ii) the specific force vector and the angular rate vector measured by the IMU, acquiring, using an RI sensor attached to the dynamic platform, current RI data at the current time and last RI data at the prior time, performing an a priori transformation of the last RI data to obtain transformed last RI data based on the last navigation solution, performing an a priori transformation of the current RI data to obtain transformed current RI data based on the current navigation solution, constructing a delta pose registration cost gradient (DPRCG) measurement based on (i) the transformed last RI data, (ii) the transformed current RI data, (iii) the current navigation solution, and (iv) the last navigation solution, and determining an absolute navigation solution of a current position and a current orientation of the dynamic platform based on at least (i) the current navigation solution, and (ii) the DPRCG measurement.

According to some embodiments, a navigation system includes an IMU attached to a dynamic platform and configured to measure a specific force vector and an angular rate vector of the dynamic platform, an INS unit coupled to the IMU and configured to determine a current INS solution of a position and an orientation of the dynamic platform based on at least: (i) a previous INS solution, and (ii) the specific force vector and the angular rate vector measured by the IMU, an RI sensor attached to the dynamic platform and configured to acquire RI data, an RI data preprocessor coupled to the RI sensor and the INS unit, the RI data preprocessor configured to perform an a priori transformation of the RI data using the current INS solution to obtain transformed RI data, and an RI map database storing a plurality of keyframe maps and configured to retrieve a valid keyframe map among the plurality of keyframe maps based on the transformed RI data. The valid keyframe map having a known position and a known orientation in a navigation coordinate frame. The navigation system further includes an RI filter manager (RFM) coupled to the RI data preprocessor and the RI map database. The RFM is configured to construct a map registration cost gradient (MRCG) measurement based on at least (i) the transformed RI data, and (ii) the known position and the known orientation of the valid keyframe map. The navigation system further includes an aided INS (AINS) estimator coupled to the RFM and the INS unit. The AINS estimator is configured to determine INS error corrections and INS solution statistics based on the MRCG measurement. The INS unit is configured to update the current INS solution based on the INS error corrections. The navigation system further includes an output manager coupled to the INS unit and the AINS estimator, and configured to determine an absolute solution of a current position and a current orientation of the dynamic platform based on the current INS solution and the INS solution statistics.

According to some embodiments, a navigation system includes an IMU attached to a dynamic platform and configured to measure a specific force vector and an angular rate vector of the dynamic platform, a navigation estimator coupled to the IMU and configured to estimate a current navigation solution of a position and an orientation of the dynamic platform based on at least: (i) a previous navigation solution, and (ii) the specific force vector and the angular rate vector measured by the IMU, an RI sensor attached to the dynamic platform and configured to acquire RI data, an RI data preprocessor coupled to the RI sensor and the navigation estimator, and configured to perform an a priori transformation of the RI data using the current navigation solution to obtain transformed RI data, and an RI map database storing a plurality of keyframe maps and configured to retrieve a valid keyframe map among the plurality of keyframe maps based on the transformed RI data. The valid keyframe map has a known position and a known orientation in a navigation coordinate frame. The navigation system further includes an RI filter manager (RFM) coupled to the RI data preprocessor and the RI map database. The RFM is configured to construct a map registration cost gradient (MRCG) measurement based on at least (i) the transformed RI data, and (ii) the known position and the known orientation of the valid keyframe map. The navigation estimator is further configured to determine an absolute navigation solution of a current position and a current orientation of the dynamic platform based on at least (i) the current navigation solution, and (ii) the MRCG measurement.

According to some embodiments, a method of navigation includes measuring, using an IMU attached to a dynamic platform, a specific force vector and an angular rate vector of the dynamic platform, determining a current INS solution of a position and an orientation of the dynamic platform based on at least: (i) a previous INS solution, and (ii) the specific force vector and the angular rate vector measured by the IMU, acquiring, using an RI sensor attached to the dynamic platform, range image data (RI data), performing an a priori transformation of the RI data using the current INS solution to obtain transformed RI data, and retrieving, from an RI map database, a valid keyframe map among a plurality of keyframe maps based on the transformed RI data. The valid keyframe map has a known position and a known orientation in a navigation coordinate frame. The method further includes constructing a map registration cost gradient (MRCG) measurement based on at least (i) the transformed RI data, and (ii) the known position and the known orientation of the valid keyframe map, determining INS error corrections and INS solution statistics based on the MRCG measurement, updating the current INS solution based on the INS error corrections, and determining an absolute INS solution of a current position and a current orientation of the dynamic platform based on the current INS solution and the INS solution statistics.

According to some embodiments, a method of navigation includes measuring, using an IMU attached to a dynamic platform, a specific force vector and an angular rate vector of the dynamic platform, determining a current navigation solution of a position and an orientation of the dynamic platform based on at least: (i) a previous navigation solution, and (ii) the specific force vector and the angular rate vector measured by the IMU, acquiring, using an RI sensor attached to the dynamic platform, RI data, performing an a priori transformation of the RI data using the current navigation solution to obtain transformed RI data, and retrieving, from an RI map database, a valid keyframe map among a plurality of keyframe maps based on the transformed RI data. The valid keyframe map has a known position and a known orientation in a navigation coordinate frame. The method further includes constructing a map registration cost gradient (MRCG) measurement based on at least (i) the transformed RI data, and (ii) the known position and the known orientation of the valid keyframe map, and determining an absolute navigation solution of a current position and a current orientation of the dynamic platform based on at least (i) the current navigation solution, and (ii) the MRCG measurement.

DETAILED DESCRIPTION

Figure 1A:
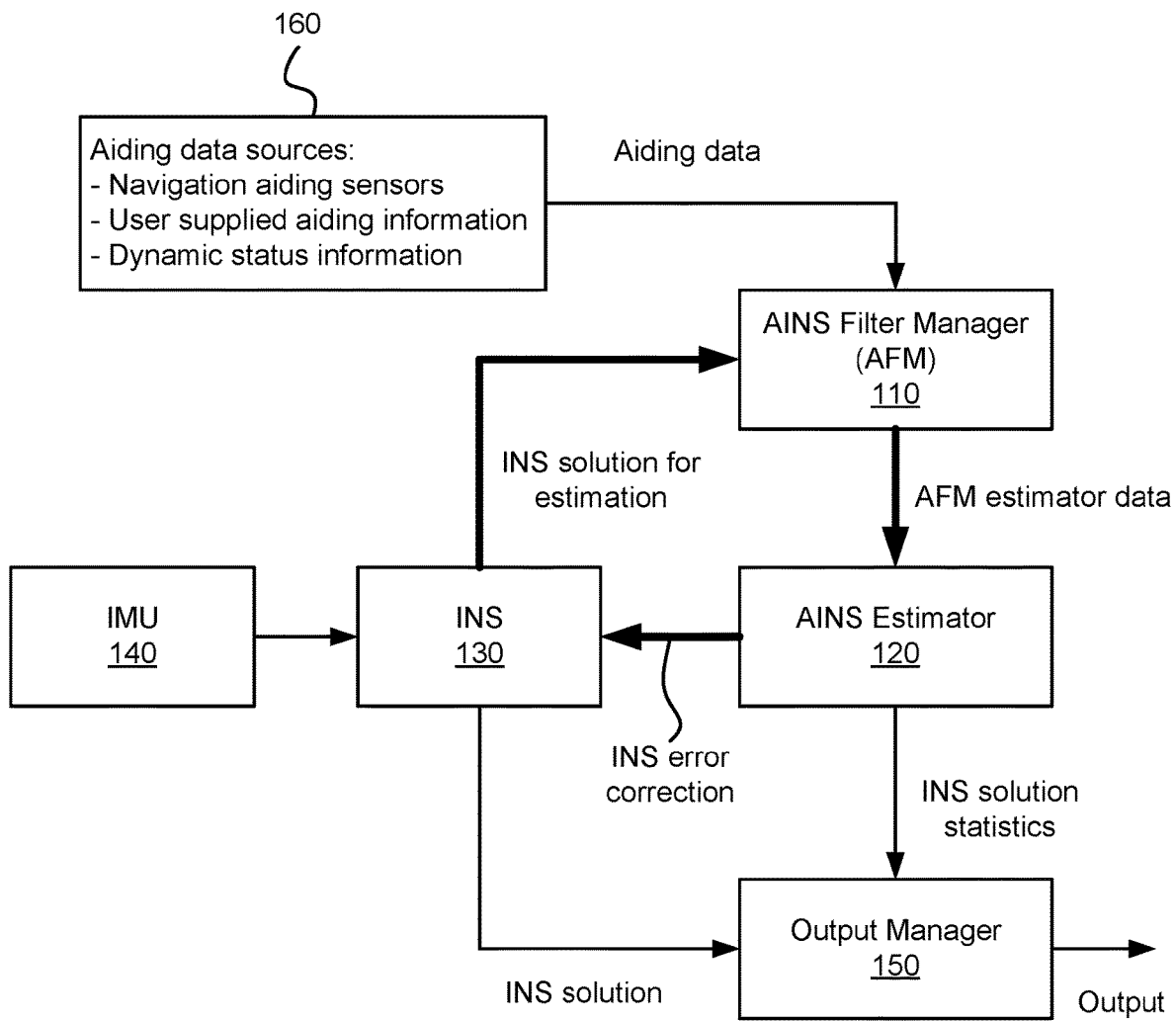
FIG. 1A shows an exemplary block diagram of an aided INS (AINS).

According to some embodiments, range image aided inertial navigation systems (RI-AINS's) are provided. A range image is a three-dimensional (3D) image of a scene or objects. A range image can be stored as a record of range image (RI) data. The RI data can include a set of point vectors in a 3D range image coordinate frame. Such RI data is also referred to as a point cloud.

RI data records can be generated by a range image sensor (RI sensor) at a given acquisition time or time window. Examples of RI sensors include a 3D lidar, a 3D radar, a 3D camera unit, and the like. Range image sampling density can range from photo density as might be generated by a stereo camera to sparse density that might be generated by a low-cost 3D lidar or a 3D radar.

Range image registration is a process of determining a range image transformation that brings one range image into alignment with another range image. Such a transformation can include a rotation followed by a translation of the first range image with respect to the second range image so that the transformed first range image is aligned with the second range image as measured by a zero or minimal alignment error.

One method of range image registration is the iterative closest point (ICP) method. (See, e.g., Chen and Medioni, Object modeling by registration of multiple range images, *Proceedings of the* 1991 *IEEE International Conference on Robotics and Automation*, pp. 2724-2729.) The ICP method can estimate a six degree of freedom (6 DOF) transformation, which includes a 3D translation and a 3D rotation, that brings one range image into alignment with another range image. The ICP method can minimize a registration error cost that is the sum of the distances squared between transformed points in one range image and their nearest neighbors in the other range image. The registration error cost can be minimized by numerical optimization if the optimal rotation is large or by using a closed form solution if the rotation component of the optimal transformation is small. The closed form solution can include a least squares adjustment that results from setting the registration error cost gradient with respect to the transformation components to zero.

According to some embodiments, an RI-AINS can construct the registration error cost gradient in the ICP method as a measurement in an AINS estimator, thereby achieving a tightly coupled integration of ICP with the AINS. The rotation component of the optimal transformation can be made small by bringing one range image into an approximate alignment with the other range image with an a priori transformation computed from the AINS position and orientation solution. The registration error cost gradient measurement after the a priori transformation can then be cast as a linear model of the INS errors, the RI sensor installation parameter errors, and the RI sensor errors that are all contained in an AINS estimator state vector. An AINS error regulation loop can correct the inertial navigator with the estimated INS errors, and thereby drive a measurement residual to a zero mean. The measurement residual is the difference between a constructed measurement and a prediction of the measurement by the estimator at the measurement time of validity.

In some embodiments, an RI-AINS can perform map based localization (MBL) aiding by constructing a map registration cost gradient (MRCG) measurement from RI data acquired by the RI sensor and a previously acquired and prepared range image map that is resolved in a keyframe having known position and orientation with respect to the earth. The RI-AINS for MBL can include a collection of RI maps, referred to as a map database, to provide keyframe maps at the RI sensor positions during a navigation session. The MRCG measurement can cast the registration error cost gradient after the a priori transformation as a linear combination of the INS position and orientation errors and the RI sensor installation parameter errors. The AINS error regulation mechanism can constrain the AINS position error to be consistent with the keyframe map errors and thereby achieve MBL.

In some embodiments, an RI-AINS can perform visual odometer (VO) aiding by constructing a delta pose registration cost gradient (DPRCG) measurement in its AINS estimator. The a priori transformation brings the range image at the last measurement construction time into approximate alignment with the current range image using the current and last INS solutions. The DPRCG measurement model can cast the registration error cost gradient after the a priori transformation as a linear combination of the INS velocity error and the RI sensor installation parameter errors. The AINS error regulation mechanism can constrain the AINS velocity error and thereby achieve a position error growth that is consistent with VO navigation.

In range image registration methods that use ICP processes that operate only on the RI data, the MBL position fixes and delta poses can become inaccurate in one dimension if the imaged scene provides geometric constraints on range image alignment in only two dimensions (e.g., a long featureless hallway). The MBL position fixes and delta poses can become inaccurate in two dimensions if the imaged scene provides geometric constraints on range image alignment in only one dimension (e.g., a flat featureless surface). Thus, a separate ICP process can become uncertain in the unconstrained dimension(s) and may need to be reconfigured to operate in the constrained dimensions.

In comparison, the RI-AINS according to some embodiments can advantageously achieve accurate and robust navigation accuracy from the AINS using range image aiding in all operation scenarios, including those that can cause ICP by itself to fail due to constraint degradations in the imaged scene. This advantage can be achieved by the tightly coupled integration of the ICP method with an AINS in the following ways.

First, the MRCG and DPRCG measurements can automatically provide stochastic observability of the AINS state vector projected onto the constrained dimensions. The AINS estimator can automatically handle defective scene geometries without having to alter the RI data processing method. Second, the AINS can act as a low-pass filter on the aiding sensor data errors. This feature can allow effective RI aiding with relatively few RI data points. As the quality and accuracy of the IMU increases, the dependence of the AINS solution accuracy on aiding sensor data quality and accuracy can diminish. This implies that the number of RI data points required to provide effective aiding can decrease as the quality of the IMU increases.

Range Image Registration
Coordinate Frame

A coordinate frame can be a Cartesian coordinate frame or a polar coordinate frame. A point in 3D space can be assigned a position in a Cartesian coordinate frame in the form of its x, y, z coordinates, or in a polar coordinate frame in the form of its r, θ, ϕ coordinates. A vector representation of such a point is, $$\vec{p}^c = \begin{bmatrix} p_x^c \\ p_y^c \\ p_z^c \end{bmatrix},$$

where $p_x^c$, $p_y^c$, $p_z^c$ are x, y, z coordinates in a Cartesian coordinate frame identified by the letter c called the c-frame. The equivalent polar coordinates are defined by the well-known transformation between Cartesian and polar coordinates.

Range Image

A range image can be a collection of data records, each including the Cartesian or polar coordinates of a point in 3D space, and possibly other information such as the sampling time and image intensity. In some embodiments, the mathematical description of a range image can be a set P of points in a Cartesian coordinate frame called the range image (ri) frame represented as follows, $$P=\{\vec{p}_1^{ri},\ldots,\vec{p}_{n_P}^{ri}\}.$$

The number of points and hence the range image sampling density can be arbitrarily large so as to achieve what appears to be a continuous 3D surface. Alternatively, it can be small enough so that the range image has the discrete sampled surface appearance of a finite point cloud.

Range Image Sensor

A range image can be generated by a range image (RI) sensor at a given acquisition time or over a given time window. Examples of RI sensors include a 3D scanning LiDAR, a 3D imaging radar, or a stereo camera array with range image generation capability. The RI sensor can be free-running or triggered. A free running RI sensor can have a RI data record output frequency set by an internal clock or the RI sensor mechanization. A triggered RI sensor can generate a RI data record when triggered by a command message or signal.

Range Image Sensor Pose

A range sensor (rs) Cartesian coordinate frame can describe the principal directions of the RI sensor. The ri-frame can have a time-varying orientation with respect to the rs-frame if the RI sensor has a rotating "look" direction with respect to its base or housing. Any such non-zero and possibly time varying orientation of the ri-frame with respect to the rs-frame is assumed to be reported by the RI sensor.

The position and orientation of the rs-frame with respect to a reference coordinate frame is referred to as the pose of the RI sensor. The reference frame can be any coordinate frame for the purpose of defining and measuring the RI sensor pose. The change in the position and orientation of the RI sensor between two range image acquisition times is called the pose change or delta pose of the RI sensor.

Range Image Map

A range image (RI) map is a range image whose members have coordinates with respect to a common earth referenced coordinate frame. Examples of earth referenced coordinates are geographic coordinates (latitude, longitude, altitude), earth fixed Cartesian frame coordinates (x, y, z components) and local level Cartesian frame coordinates (North, East, Down or North, West, Up components). An earth referenced map frame is needed for aided INS because the INS navigates in an earth referenced coordinate frame.

A keyframe map is a RI map $Q=\{\vec{q}_1^{km},\ldots,\vec{q}_{n_Q}^{km}\}$ whose members are resolved in a Cartesian coordinate frame referred to as a key (map) (km) frame associated with the range image Q. The keyframe can be a common coordinate frame in which the keyframe map is assembled from possibly multiple range images acquired at different times from the RI sensor. The position and orientation of the keyframe can be cast with respect to the earth as follows.

In an earth fixed Cartesian frame, the keyframe origin position is given as earth-fixed Cartesian coordinates $\vec{r}_{km}^e=\{x_{km}^e,y_{km}^e,z_{km}^e\}$, and its orientation is given by the direction cosine matrix (DCM) $C_g^{km}$ from the local geographic frame to the keyframe that can be computed from the Tait-Bryan angles (roll, pitch, heading) $\{\phi_{km}, \theta_{km}, \psi_{km}\}$ of the keyframe with respect to the local North, East and Down directions.

In a local geographic frame, the keyframe origin position is given as geographic coordinates (latitude, longitude, altitude) $\{\lambda_{km}, L_{km}, h_{km}\}$, and its orientation is given by Tait-Bryan angles (roll, pitch, heading) $\{\phi_{km}, \theta_{km}, \psi_{km}\}$ with respect to the local North, East and Down directions.

A map database (MDB) can include a set of keyframe maps and a method of accessing a keyframe map whose keyframe position is closest to a specified position.

Transformation Between Coordinate Frames

A transformation between two coordinate frames can be defined to be a rotation from the starting frame to the destination frame followed by a translation of the starting frame origin to the destination frame origin resolved in the destination frame. The DCM $C_s^d$ and translation vector $\vec{t}_{sd}^d$ respectively describe the orientation and translation of the destination (d) frame with respect to the start (s) frame. These are combined into a 4×4 affine transformation $T_{sd}^d$ operating on a homogeneous pose vector $\bar{p}^s$ given as follows, $$T_{sd}^d = \begin{bmatrix} C_s^d & \vec{t}_{sd}^d \\ 0_{1\times 3} & 1 \end{bmatrix}, \bar{p}^s = \begin{bmatrix} \vec{p}^s \\ 1 \end{bmatrix}.$$

The transformation captures the order of rotation and translation operations, $$T_{sd}^d \bar{p}^s = \begin{bmatrix} C_s^d & \vec{t}_{sd}^d \\ 0_{1\times 3} & 1 \end{bmatrix} \begin{bmatrix} \vec{p}^s \\ 1 \end{bmatrix} = \begin{bmatrix} C_s^d \vec{p}^s + \vec{t}_{sd}^d \\ 1 \end{bmatrix}.$$

Hereafter the distinction between $\bar{p}^s$ and $\vec{p}^s$ is dropped and the applicable 3 or 4 dimensioned vector is assumed by the context in which it is used. In particular, $$T_{sd}^d \vec{p}^s = C_s^d \vec{p}^s + \vec{t}_{sd}^d \quad (1)$$

A DCM $C_s^d$ can be formulated in a number of different ways. Examples include the following representations using three independent variables.

In Tait-Bryan angles ($\phi$, $\theta$, $\psi$), $$C_s^d = \begin{bmatrix} \cos\theta\cos\psi & \cos\theta\sin\psi & -\sin\theta \\ \sin\phi\sin\theta\cos\psi - \cos\phi\sin\psi & \sin\phi\sin\theta\sin\psi + \cos\phi\cos\psi & \sin\phi\cos\theta \\ \cos\phi\sin\theta\cos\psi + \sin\phi\sin\psi & \cos\phi\sin\theta\sin\psi - \sin\phi\cos\psi & \cos\phi\cos\theta \end{bmatrix} \quad (2)$$

In rotation vector elements, $$\vec{\theta} = \begin{bmatrix} \theta_x \\ \theta_y \\ \theta_z \end{bmatrix} = \theta\vec{u}_\theta = \begin{bmatrix} \theta u_x \\ \theta u_y \\ \theta u_z \end{bmatrix},$$

$$C_s^d = I + \sin\theta(\vec{u}_\theta \times) + (1-\cos\theta)(\vec{u}_\theta \times)(\vec{u}_\theta \times).$$

This makes $T_{sd}^d$ a function of six independent variables in which the rotation variables are either Tait-Bryan angles or rotation vector elements:

$$T_{sd}^d = T_{sd}^d(t_x, t_y, t_z, \phi, \theta, \psi) \quad (3)$$
$$= T_{sd}^d(t_x, t_y, t_z, \theta_x, \theta_y, \theta_z)$$

Range Image Registration Problem

Two range images of the same scene or object that are acquired at different times and/or different range image sensor poses can be brought into alignment by a transformation of one range image with respect to the other as described by Equation (1). The process of finding such a transformation is referred to as range image registration.

Consider two range images $P=\{\vec{p}_1^{ri}, \ldots, \vec{p}_{n_P}^{ri}\}$ and $Q=\{\vec{q}_1, \ldots, \vec{q}_{n_Q}\}$ that have arbitrarily dense sampling so that a point $\vec{q}_{ji}$ in Q can be found that corresponds to any point $\vec{p}_i$ in P. The coordinate frame superscripts are hereafter omitted because they are implied by a point's membership in sets P and Q. Points $\vec{p}_i \in P$ and $\vec{q}_{ji} \in Q$ that are respective images of the same point in 3D space form a common image point pair $s_i=\{\vec{p}_i, \vec{q}_{ji}\}$. The set $S_{PQ}$ of all such point pairs contains $n_P$ members, one for each point in P.

The registration problem then becomes one of finding a rigid transformation $T_{pq}^q$ with zero residual transformation error at all common image point pairs. The P range image (p) frame is the starting frame and the Q range image (q) frame is the destination frame. These are hereafter assumed, and so the p and q subscripts and superscript are dropped so that $T_{pq}^q = T$. The range image problem statement is expressed as follows, $$|T\vec{p}_i - \vec{q}_{ji}|=0 \forall s_i=\{\vec{p}_i, \vec{q}_{ji}\} \in S_{PQ}.$$

The imaged surface is assumed to be rigid, which implies that the transformation T can be found using a subset of $n_c < n_P$ common image point pairs from $S_{PQ}$, referred to as control points, $$\tilde{S}_{PQ}=\{S_{PQ}\}_k, k=1, \ldots, n_c.$$

This admits a registration cost function that is sum-squared distances between corresponding control points in P following a transformation T and Q, $$e = \sum_{s_i \in \tilde{S}_{PQ}} |T\vec{p}_i - \vec{q}_{ji}|^2. \quad (4)$$

Without loss of generality P can be recast as the set of $\vec{p}_i$ in $\tilde{S}_{PQ}$ and $n_P=n_c$ so that any further references to $\tilde{S}_{PQ}$ can be dropped. Equation (4) can then be re-stated as follows, $$e = \sum_{i=1}^{n_p} |T\vec{p}_i - \vec{q}_{ji}|^2. \quad (5)$$

The registration problem then becomes one of finding T that minimizes Equation (5).

Point-to-Point Registration Problem

A more practical problem statement recognizes that range images P and Q are generated by the same range imaging sensor and therefore have the same approximate sampling densities. This implies that $\vec{q}_{ji}$ in $S_{PQ}$ are unknown and that Q includes a finite set of $n_Q$ points given by, $$Q=\{\vec{q}_1, \ldots, \vec{q}_{n_Q}\}.$$

The point-to-point registration cost function replaces $\vec{q}_{ji}$ in Equation (5) with $\vec{q}_j \in Q$ that is a nearest neighbor to $\vec{p}_i$ according to a measure of distance between $\vec{p} \in P$ and $\vec{q} \in Q$. A nearest neighbor search function (NNSF) finds the point $\vec{q}_j \in Q$ that is closest to $\vec{p}_i$ according to a k-dimensional (kd) distance function $d_{kd}(\vec{p}, \vec{q})$, $$\vec{q}_{nn}(\vec{p} \in P) = \vec{q}_j \in Q \text{ such that } d_{kd}(\vec{p}, \vec{q}_j) = \min_l d_{kd}(\vec{p}, \vec{q}_l).$$

The point-to-point distance function is the translational distance between $\vec{p} \in P$ and $\vec{q} \in Q$. A common ri frame for computing the distance is assumed, $$d_0(\vec{p}, \vec{q}) = |\vec{p}, \vec{q}| \quad (6)$$

The point-to-point registration cost is then given by (5) with (6), $$e = \sum_{i=1}^{n_p} [d_0(T\vec{p}_i, \vec{q}_{nn}(\vec{p}_i))]^2. \quad (7)$$

Minimization of Equation (7) is viable if P and Q have a sufficiently accurate a priori alignment that allows sufficiently reliable nearest neighbors per point in P to be found. The transformation T that minimizes Equation (7) becomes a correction to the a priori alignment.

Point-to-Plane Registration Problem

A convergent ICP solution to the point-to-point registration problem may not be feasible because of ambiguous nearest neighbors. One example is an imaged surface that includes a plane. A point P can slide arbitrarily along the plane with respect to Q with no change in the registration cost function. Each iteration can alter $\vec{t}_{sd}^{\,d}$ in T(k) arbitrarily along the plane and thereby avoid any definitive convergence. Such an iterative process is said to be unstable.

To get around this problem, one proposed solution is to replace the distance between $T\vec{p}_i$ and $\vec{q}_j$ in Equations (7) and (9) with the distance between $T\vec{p}_i$ and a tangent plane at $\vec{q}_j$. (See, e.g., Chen and Medioni, Object modeling by registration of multiple range images, *Proceedings of the 1991 IEEE International Conference on Robotics and Automation*, pp. 2724-2729.) The point to tangent plane distance is the projection of $T\vec{p}_i - \vec{q}_j$ onto the unit vector $\hat{n}_j$ perpendicular to the tangent plane, called the surface normal vector at $\vec{q}_j$. $\hat{n}_j$ is assumed to be computed by a surface normal vector function $\hat{n}_Q(\vec{q})$ as $\hat{n}_j = \hat{n}_Q(\vec{q}_j)$. Several different methods can be used to compute a surface normal vector. One example method computes the numerical covariance matrix from data points around $\vec{q}$ and then computes the surface normal vector as the eigenvector associated with the smallest eigenvalue of the covariance matrix.

The following point-to-tangent plane distance function uses $\hat{n}_Q(\vec{q})$ to compute the shortest distance from a point $\vec{p} \in P$ to the tangent plane at $\vec{q} \in Q$, $$d_1(\vec{p}, \vec{q}) = |(\vec{p}, \vec{q}) \cdot \hat{n}_Q(\vec{q})|.$$

The point-to-plane registration cost is then given by Equation (5) with Equation (6), $$e = \sum_{i=1}^{n_p} [d_1(T\vec{p}_i, \vec{q}_{nn}(\vec{p}_i))]^2. \quad (8)$$

The translational stability issue with the point-to-point registration problem is removed in the point-to-plane registration problem. If the imaged surface is a plane, then all points in Q have the same surface normal vector. Translational distances between points in overlapping regions of P and Q are orthogonal to the common surface normal vector, and therefore do not alter the registration cost expressed in Equation (8). The transformation T that minimizes the registration cost (8) is ambiguous in the plane, which allows the optimally transformed range image P to "slide" in the plane.

Solutions to the Registration Problem

The 6-DOF transformation between range images P and Q can be found by minimizing the registration error cost. The registration cost function is nonlinear in the independent pose variables (3), and hence a global closed solution doesn't exist. If the rotation difference between the range images is small, then a closed form least squares adjustment can be used to solve for the transformation components. Otherwise a numerical gradient descent optimization method may be used.

An iterative optimization can be used to accommodate an inaccurate starting alignment and an uncertain nearest neighbor search. The registration cost function to be minimized at iteration k is, $$e(k) = \sum_{i=1}^{n_p} [d_1(T(k)\vec{p}_i, \vec{q}_{nn}(T(k-1)\vec{p}_i))]^2, \quad (9)$$

where T(k−1) is the transformation that minimizes the same registration cost function at iteration k−1. This is the point-to-plane iterative closest point (ICP) registration problem. A successful solution finds transformations T(k) at iterations k=0, 1, . . . that converge to a steady-state transformation $T_\infty = T(k \to \infty)$ that produces the minimum registration cost, i.e. $e(k \to \infty) \le e(k < \infty)$. A practical solution declares convergence when $|e(k+1) - e(k)| \le \Delta e_{max}$, where $\Delta e_{max}$ is a specified convergent cost difference threshold.

The point-to-plane ICP method may be a more advantageous method of range image registration because it is tolerant of defective geometries in the range images as defined by the span of the surface normal vectors of either range image.

Closed Form Point-to-Plane Registration Solution

Let $\vec{q}_{nn}(T\vec{p}_i) = \vec{q}_j$, $\hat{n}_Q(\vec{q}_j) = \hat{n}_j$ so that (8) can be written as, $$e = \sum_{i=1}^{n_p} [d_1(T\vec{p}_i, \vec{q}_j)]^2. \quad (10)$$

T is cast as a translation vector $\vec{t}$ and a vector of small rotation angles $\vec{\phi}$ that allows the DCM to be approximated by, $$C_p^q \cong I + (\vec{\phi} \times) \quad (11)$$

where $(\vec{\phi} \times)$ is the skew-symmetric matrix representation of the vector cross-product operator for vector $\vec{\phi}$.

The distance function in Equation (10) with Equation (11) is given as follows, $$T\vec{p}_i - \vec{q}_j = (I + (\vec{\phi} \times))\vec{p}_i + \vec{t} - \vec{q}_j \quad (12)$$

$$= \vec{p}_i - \vec{q}_j + [I \mid -(\vec{p}_i \times)]\vec{x}_T$$

$$d_1(T\vec{p}_i, \vec{q}_{nn}(\vec{q}_j)) = \vec{n}_j^T(\vec{p}_i - \vec{q}_j + [I \mid -(\vec{p}_i \times)]\vec{x}_T), \quad (13)$$

where $$\vec{x}_T = \begin{bmatrix} \vec{t} \\ \vec{\phi} \end{bmatrix} \quad (14)$$

is the vector of transformation parameters called the transformation state vector.

Equation (13) can be cast as follows, $$d_1(T\vec{p}_i, \vec{q}_{nn}(\vec{q}_j)) = d_{ij} + \Delta d_{ij} \quad (15)$$

where $$d_{ij} = \vec{n}_j^T(\vec{p}_i - \vec{q}_j)$$

is the signed distance between $\vec{p}$ and the tangent plane at $\vec{q}_j$ before the transformation T, and $$\Delta d_{ij} = \vec{n}_j^T B_i \vec{x}_T \quad (16)$$

$$B_i = [I \mid -(\vec{p}_i \times)]$$

is the correction to $d_{ij}$ resulting from the transformation T.

The registration cost function (10) with (13), (14) and (15) then becomes, $$e(\vec{x}_T) = \sum_{i=1}^{n_p} (d_{ij} + \vec{n}_j^T B_i \vec{x}_T)^2. \quad (17)$$

The gradient vector of the distance correction (16) with respect to the vector of transformation parameters (14) is, $$\frac{\partial \Delta d_{ij}}{\partial \vec{x}_T} = B_i^T \vec{n}_j = \begin{bmatrix} \vec{n}_j \\ \vec{p}_i \times \vec{n}_j \end{bmatrix}.$$

This is used in the following development of the gradient vector of the registration cost function (17), $$\nabla e(\vec{x}_T) = \sum_{i=1}^{n_p} \frac{\partial}{\partial \vec{x}_T}((d_{ij} + \vec{n}_j^T B_i \vec{x}_T)^2) \quad (18)$$

$$= 2\sum_{i=1}^{n_p} [d_{ij} B^T \vec{n}_j + B_i^T \vec{n}_j \vec{n}_j^T B_i \vec{x}_T],$$

$$= 2(\vec{z} - H\vec{x}_T)$$

where $$\vec{z} = \sum_{i=1}^{n_p} \left[ \vec{n}_j^T(\vec{p}_i - \vec{q}_j) \begin{bmatrix} \vec{n}_j \\ \vec{p}_i \times \vec{n}_j \end{bmatrix} \right] \quad (19)$$

$$H = -\sum_{i=1}^{n_p} [B_i^T \vec{n}_j \vec{n}_j^T B_i] \quad (20)$$

$$= -\sum_{i=1}^{n_p} \begin{bmatrix} \vec{n}_j \vec{n}_j^T & \vec{n}_j(\vec{p}_i \times \vec{n}_j)^T \\ (\vec{p}_i \times \vec{n}_j)\vec{n}_j^T & (\vec{p}_i \times \vec{n}_j)(\vec{p}_i \times \vec{n}_j)^T \end{bmatrix}$$

Setting $\nabla e(\hat{\vec{x}}_T) = \vec{0}$ for an optimal solution results in a linear equation in the six transformation parameters.

$$H\hat{\vec{x}}_T = \hat{\vec{z}} \quad (21)$$

Equation (21) can be solved if H has full rank. Alternatively Equation (21) can be solved in a subspace defined by the complement of the kernel of H. In either case, Equation (21) can be solved iteratively as described by Equation (9) to yield a point-to-plane ICP solution.

Navigation Via Range Image Registration

Range image registration can be used to measure the delta pose of the RI sensor. The delta poses of successive range images can be integrated to yield the relative pose of the RI sensor with respect to a starting pose. This is referred to as visual odometry (VO).

Range image registration can be used to measure the pose of the RI sensor with respect to a range image whose pose is referenced to a position with respect to the earth and orientation with respect to local North-East-Down directions. Such a range image is called a map. The relative pose of an acquired range image to a map is then used to compute the position of the RI sensor and its orientation with respect to local North-East-Down directions. This is referred to as map based localization (MBL).

Range image geo-referencing using a position and orientation measurement instrument such as an AINS can be used to generate maps. VO using successive range images can also be used to propagate a RI sensor pose from a reference position and orientation that is then used to compute the pose of a map with respect to the reference position and orientation. This is referred to as map generation or simply mapping.

Concurrent MBL using existing maps and map generation when an existing map is not available is referred to as simultaneous localization and mapping (SLAM).

Aided INS

FIG. 1A shows an exemplary block diagram of an aided INS (AINS). The inertial measure unit (IMU) 140 can measure the platform specific force (gravitational force plus Coriolis force and platform accelerations) vector and angular rate vector, both about its orthogonal input axes. For example, the IMU 140 can include three accelerometers for measuring linear specific force in three orthogonal directions, respectfully, and three gyroscopes for measuring angular rates around three orthogonal axes, respectfully. The three accelerometers can be referred to as a three-axis accelerometer. The three gyroscopes can be referred to as a three-axis gyroscope. The IMU 140 can output data records at a relatively high sampling rate, for example at 50 to 1000 samples per second. The IMU 140 can output time-sampled records containing: (i) specific force vector and angular rate vector, or (ii) incremental velocity vector and incremental angle vector. The incremental velocity vector is the specific force vector integrated over the sampling interval. The incremental angle vector is the angular rate vector integrated over the sampling interval. In some embodiments, the incremental velocity vector and the incremental angle vector may be preferred in an INS, because the INS solution may not suffer from accumulated quantization noise.

The INS 130 can determine an INS solution of a current position and a current orientation of the IMU based on a previous INS solution and the incoming IMU record (which can include the specific force vector and the angular rate vector measured by the IMU). (INS) 130 can include the inertial navigator mechanization, INS solution initializer, and inertial navigator corrector. The inertial navigator mechanization can operate on each incoming IMU record and therefore iterates at the IMU data rate. The inertial navigator mechanization can solve Newtons equations of the motion of the IMU with respect to the rotating earth from an initial solution generated by the INS solution initializer. The inertial navigator corrector can adjust the inertial navigator state using externally provided corrections.

The aiding data sources 160 can include, for example, navigation aiding sensors, user supplied aiding information, dynamic status information, and the like. A navigation aiding sensor can measure a component of the platform navigation solution including its position, velocity, orientation and orientation rate. Examples of navigation sensors include global navigation satellite systems (GNSS) receiver, wheel odometer on a land vehicle, zero velocity detector, radar (e.g., Doppler radar) or sonar, magnetic compass or magnetometer, and the like. User-supplied aiding information can include components of the platform navigation solution provided to the aide INS by an operator via a user interface such as a control and display unit. Examples of user-supplied aiding information include ground control point (GCP) position, stationary platform status, heading, and the like. Dynamic status information can include components of the platform navigation solution deduced from the IMU data or aiding sensor data. Examples of dynamic status information include stationary platform status, constant velocity status, and the like.

The AINS filter manager (AFM) 110 can construct the AINS estimator input data, which can include the following: (i) time update data, including the state transition matrix and the discrete process noise covariance matrix; (ii) measurement update data including INS aiding sensor measurements and their measurement model data; and (iii) state and covariance initialization and reset data.

The AINS estimator 120 can be configured to determine INS error corrections and INS solution statistics. The AINS estimator 120 can run a multivariable state estimator, which can be a Kalman filter. The multivariable state can include, for example, inertial navigator errors, inertial sensor errors, aiding sensor errors, installation parameter errors for these aiding data, and the like.

The inertial navigator errors can be modeled by a linear stochastic multivariable system called the inertial navigator error model that has a state vector including the inertial navigator errors. The inertial navigator errors can include position errors, velocity errors, alignment angle errors, and the like. Several different inertial navigator error models can be used. (See, e.g., D. O. Benson, A comparison of two approaches to pure inertial and Doppler-inertial error analysis, *IEEE Transactions on Aerospace and Electronic Systems*, Vol. AES-11, No. 4, July 1975; B. M. Scherzinger and D. B. Reid, Modified inertial navigator error models, *Proceedings of PLANS* 1994; and B. M. Scherzinger, Inertial navigator error models for large heading uncertainty, *Proceedings of PLANS* 1996, Atlanta GA) For example, the modified psi-angle error model has two manifestations, one for small heading error, and one for arbitrarily large heading error.

The following inertial sensor errors can be modeled in an AINS estimator using scalar stochastic process models such as a Gauss-Markov or random walk model: accelerometer biases, accelerometer scale errors, accelerometer triad orthogonality errors; gyro biases, gyro scale errors, gyro triad orthogonality errors, and the like.

The aiding sensor errors modeled in the AINS estimator can depend on the inclusion of Kalman filter measurements constructed from the aiding sensor data. They can be modeled in an AINS using scalar or $2^{nd}$ order stochastic process models. The aiding sensor errors can include, for example, GNSS receiver clock offset and drift, atmospheric delays in GNSS pseudorange and carrier phase observables, wavecount ambiguity in GNSS carrier phase observables, wheel odometer scale error, GCP position offset, magnetic heading bias, and the like.

The installation parameter errors modeled in the AINS can depend on the inclusion of the aiding sensor data usage in the AINS estimator. They can be modeled in an AINS using scalar or $2^{nd}$ order stochastic process models. The installation parameter errors can include, for example, IMU to aiding sensor lever arm errors, IMU to aiding sensor relative orientation errors, wheel odometer rotation to distance conversion error, and the like.

The AINS estimator 120 can perform, for example, the following estimation functions: (i) time update, including propagation of the estimated state and covariance from the previous estimator epoch to the current one; (ii) measurement update, including optimal fusion of the information in the measurements with the current estimated state and covariance; (iii) initialization of the estimated state and covariance to start the estimation process; (iv) reset of one or more states and corresponding components of the estimation covariance as required by the AFM; (v) INS correction computation based on the estimated state, and the like.

The INS 130, the AFM 110, and the AINS estimator 120 form an INS error regulation loop that regulates the INS errors to an accuracy that is consistent with the accuracies of the aiding data. In the absence of aiding data, the INS solution accuracy may degrade according to the residual errors in the estimated IMU errors and the estimated aiding sensor errors.

The output manager 150 can combine the INS solution provided by the INS 130 and the INS solution statistics computed by the AINS estimator 120, and output an absolute pose estimate that can include position and orientation, as well as descriptors of expected position errors and orientation errors such as standard deviations or protection levels. The INS 130 can output the INS solution at the IMU data rate and hence the INS mechanization iteration rate, for example between 50 and 1000 solutions per second. The relatively high solution data rate can allow sampling of high frequency motion due to vehicle vibrations and external turbulence. The INS solution statistics can be computed from the AINS estimation error covariance that the AINS estimator 120 generates as part of the estimation process. The INS solution statistics can be computed at the AINS estimator iteration rate, for example once per second. Because the INS errors can change relatively slowly, the statistics solution can be valid over its 1-second sampling interval.

A tight coupling of aiding data in an AINS is defined herein to mean the aiding data used by the AFM 110 to construct an INS-aiding data measurement are unfiltered sensor data and not the output of a stochastic estimation process that operates on the sensor data.

One example of a tight coupling is the integration of GNSS observables (pseudoranges, carrier phases and Doppler frequencies) in a GNSS-AINS estimator. The GNSS receiver operates a position-time estimation process that operates on the observables to generate a GNSS position solution including GNSS antenna position and velocity. The receiver solution is sensitive to the geometry of the available satellites and is invalid if fewer than four satellites are available. A loosely coupled GNSS-AINS estimator constructs INS-GNSS receiver position and velocity measurements, and thereby inherits the GNSS receiver solution sensitivity to satellite availability and geometry. A tightly coupled GNSS-AINS estimator constructs INS-GNSS observables measurements, and thereby is insensitive to the number of satellites or the geometry of the available satellites, because it treats each observable as an independent source of information.

Figure 1B:
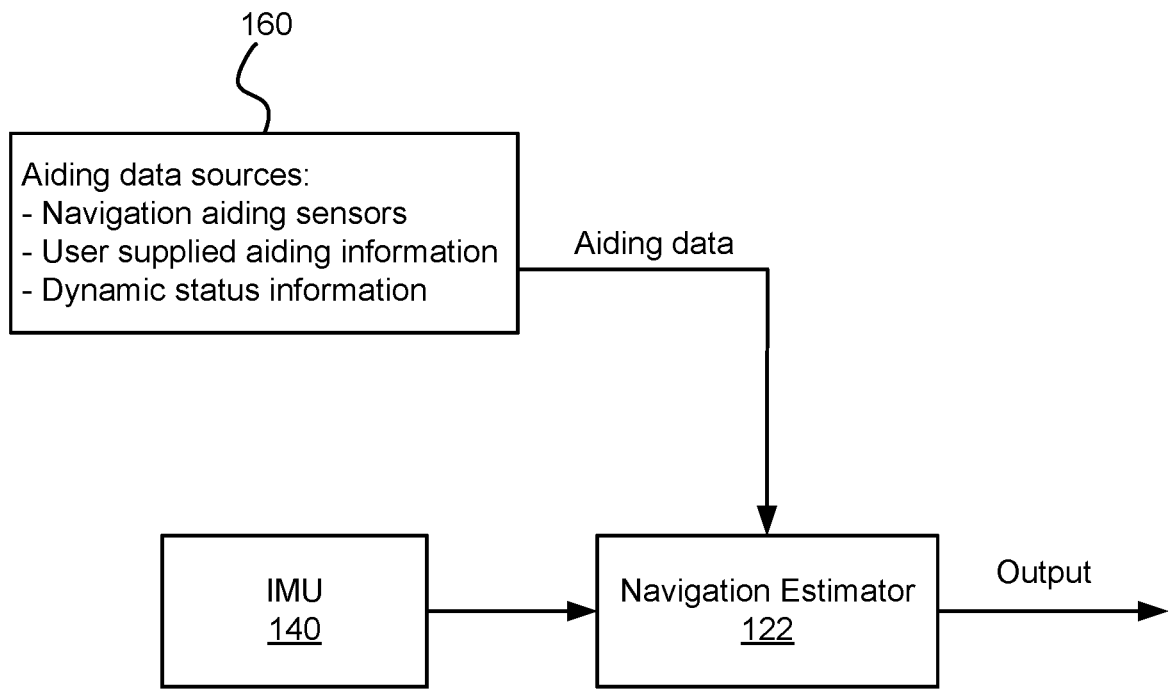
FIG. 1B shows an exemplary block diagram of a generalization of the AINS.

FIG. 1B shows an exemplary block diagram of a generalization of the AINS. In the aided INS architecture shown in FIG. 1B, a navigation estimator 122 can estimate the navigation solution and compute the navigation solution statistics using data from the IMU 140 and data from the aiding sensors 160. In some embodiments, the navigation estimator 122 can comprise the INS 130, the AFM 110, and the AINS estimator 120 as shown in FIG. 1A. In some alternative embodiments, the navigation estimator 122 can comprise an estimation process in which the navigation solution is part of an estimated state, and can construct measurements from data obtained from the IMU 140 and aiding data from the aiding sensors 160, and with these measurements can perform measurement updates of the estimated state. The estimation process used by the navigation estimator 122 can comprise, for example, a Kalman filter, a nonlinear filter, a particle filter, or the like.

According to some embodiments, a tightly coupled range image aided INS (RI-AINS) is one in which the RI data are used directly to construct measurements in the AINS estimator. An RI-AINS that integrates the outputs of a separate delta pose estimation process or MBL process is considered herein to be loosely coupled.

There are two categories of navigation methods that integrate range image data and inertial data according to the primary method of navigation (i.e., position and orientation propagation): (i) inertial aided range image navigation; and (ii) range image aided INS.

Inertial aided range image navigation uses IMU data to aid range image navigation, possibly intermittently when needed. The IMU data are integrated between range image epochs to yield an inertial delta pose that can be used to substitute a missing range image delta pose or enhance a range image delta pose that suffers from poor scene geometry constraints.

Range image aided INS uses range image data to aid INS. (See, e.g., Yanbin Gao, Shifei Liu, Mohamed M. Atia and Aboelmagd Noureldin, INS/GPS/LiDAR Integrated Navigation System for Urban and Indoor Environments Using Hybrid Scan Matching Algorithm, *Sensors* 2015, 15, 23286-23302; doi: 10.3390/s150923286.) U.S. patent application Ser. No. 16/369,720 (US Patent Application Publication 2020/0309529) discloses a range image aided INS, which integrates of delta poses computed by a separate delta pose estimation process. The resulting delta pose and MBL accuracies can be impacted by a poor scene geometry constraint, as discussed above. Thus, this is a loosely coupled range image aided INS, and not a tightly coupled range image aided INS according to the definition herein.

The descriptions below discuss two types of tightly coupled range image aided INS according to some embodiments: a tightly coupled range image map based localization (MBL) aided INS; and a tightly coupled range image delta pose aided INS.

I. Tightly Coupled Range Image Map Based Localization Aided INS

Figure 2A:
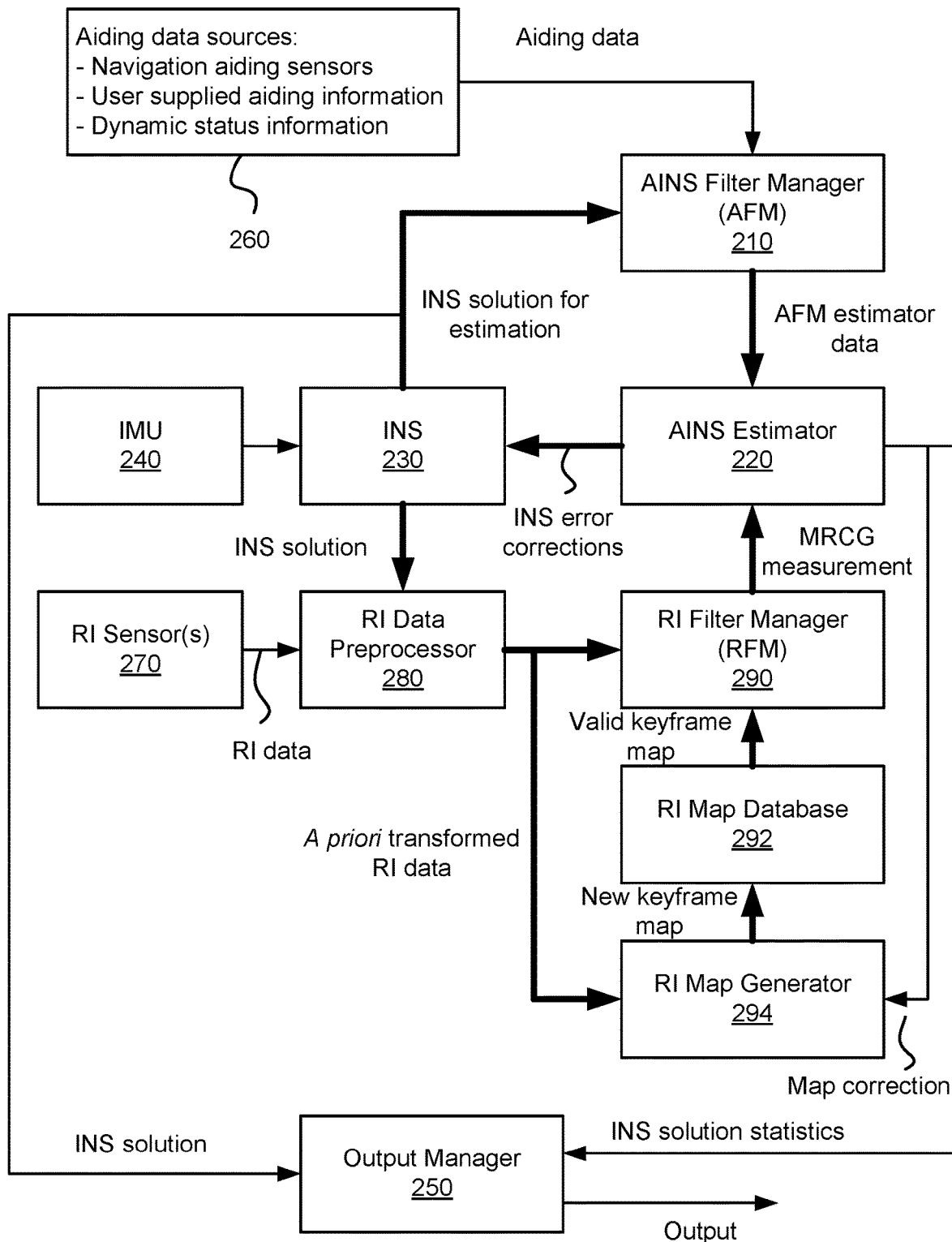
FIG. 2A shows an exemplary range image (RI) aided INS architecture configured for tightly coupled map based localization (MBL) aiding according to some embodiments.

FIG. 2A shows an exemplary RI-AINS architecture configured for tightly coupled map based localization (MBL) aiding according to some embodiments. The aiding data sources 260, the IMU 240, the INS 230, the AFM 210, and the AINS estimator 220 are similar to the aiding data sources 160, the IMU 140, the INS 130, the AFM 110, and the AINS estimator 120 shown in FIG. 1, as described above.

The RI sensor(s) 270 can generate a RI data record per data capture epoch. A triggered RI sensor that generates an RI data record at a specified measurement construction time can be assumed without loss of generality to simplify RI data time alignment with measurement construction times.

The RI data preprocessor 280 can perform, for example, the following preprocessing functions: (i) RI data filtering (discussed in more detail below); (ii) a priori transformation of the filtered RI data using the INS solution for estimation; and (iii) calculation of surface normal vectors. The RI data preprocessor 280 can output a preprocessed RI data record that is suitable for measurement construction.

The RI map generator 294 can compute a new keyframe map using the current and possibly previous a priori transformed RI data if a valid map is not available from the RI map database 292.

On receipt of the new keyframe map, the RI map database 292 can store it, and optionally perform a factor graph optimization on the stored maps to resolve misalignments between maps. The RI map database 292 can retrieve and deliver the keyframe map that is valid at the current INS position to the RI filter manager (RFM) 290. If it receives a new keyframe map, then it delivers it to the RFM 290.

The RI filter manager (RFM) 290 can receive the valid keyframe map from the RI map database 292, and the filtered and a priori transformed RI data from the RI data preprocessor 280. From these information, the RFM 290 can construct the following RI measurement update data for the AINS estimator 220: (i) map registration cost gradient (MRCG) measurement; and (ii) state reset data related to MRCG measurements.

The AINS estimator 220 can perform, for example, state initializations, time updates and measurement updates on receipt of the RFM data, and the like. The state vector in the AINS estimator 220 can include the following elements related to RI-AINS: (i) RI sensor errors; (ii) RI sensor installation parameter errors; and (iii) map position and orientation errors.

The AINS estimator 220 can compute, for example, the map keyframe position and azimuth corrections from the estimated state vector and covariance related to RI-AINS.

The output manager 250 is similar to the output manager 150 in FIG. 1 as described above. It can combine the INS solution provided by the INS 230 and the INS solution statistics computed by the AINS estimator 220, and output an absolute pose estimate, including position and orientation.

Figure 2B:
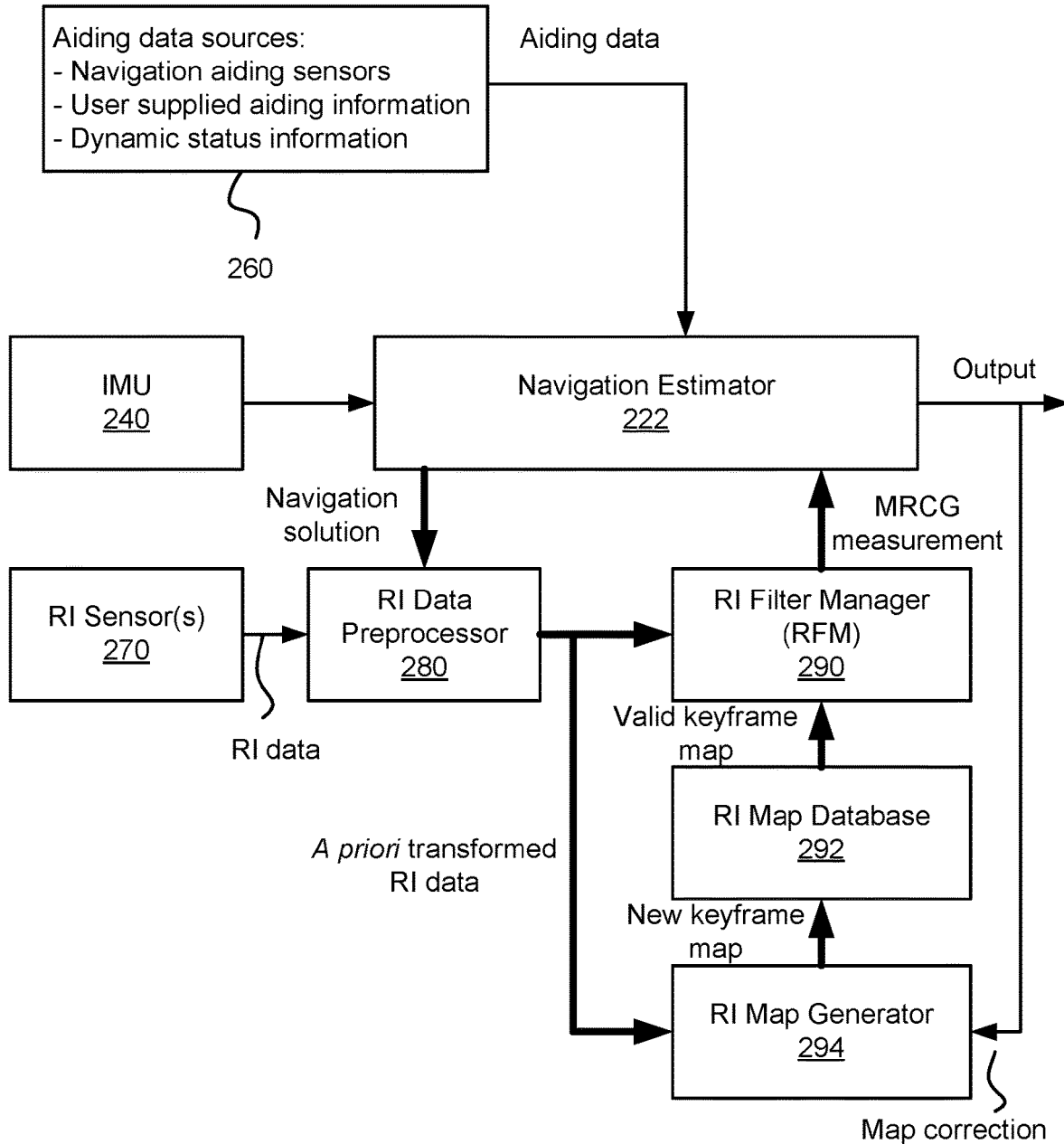
FIG. 2B shows another exemplary RI aided INS architecture configured for tightly coupled MBL aiding according to some embodiments.

FIG. 2B shows an exemplary generalization of the RI-AINS architecture configured for tightly coupled MBL aiding according to some embodiments. In the RI-AINS architecture shown in FIG. 2B, a navigation estimator 222 can estimate the navigation solution and compute the navigation solution statistics using data from the IMU 240, aiding data from the aiding sensors 260, and the MRCG measurement data from the RFM 290. In some embodiments, the navigation estimator 222 can comprise the INS 230, the AFM 210, and the AINS estimator 220 as shown in FIG. 2A. In some alternative embodiments, the navigation estimator 222 can comprise an estimation process in which the navigation solution is part of an estimated state, and can construct measurements from data obtained from the IMU 240, the aiding data from the aiding sensors 260, and the MRCG measurement data from the RFM 290, and with these measurements can perform measurement updates of the estimated state. The estimation process used by the navigation estimator 222 can comprise, for example, a Kalman filter, a nonlinear filter, a particle filter, or the like.

A. Map Registration Cost Gradient Measurement

According to some embodiments, the output of the RFM 290 can be a map registration cost gradient (MRCG) measurement. The MRCG measurement can be cast as a measurement in the AINS estimator 220. The RI data used to construct the measurement are a map that is valid at the current RI sensor position and a current range image transformed to an approximate alignment with the map using the a priori AINS position and orientation solution. The MRCG measurement model relates the INS position and orientation errors to the residual transformation state vector described by Equation (14), thereby causing the MRCG measurement to observe these INS errors and the INS error regulation feedback loop to effectively generate an ICP solution. Thus, the MRCG measurement is a tightly coupled measurement that is computed from the RI data directly without an intermediary estimation step, as defined and discussed above.

Input Data

The data input to the RFM 290 can include installation parameters, RI sensor data, aided INS data, keyframe data, and the like, as discussed below.

RI Sensor Installation Parameters

The RI sensor installation parameters describe the position and orientation of the rs frame with respect to a user0 (u0) coordinate frame. The user0 frame is the location on a moving vehicle whose position and orientation the AINS would measure. It can be considered the desired location of the IMU. The user0 frame may not coincide with the IMU coordinate frame if physical restrictions are imposed on the IMU's location. In this case, the INS transforms the computed IMU position and orientation to that of the user0 frame. The coordinate frame is called user0 because it is fixed rigidly to the dynamic platform (e.g., a vehicle). This differentiates it from a user coordinate frame that is fixed to a rotating or gimballed platform on the dynamic platform. The RI sensor installation parameters can include the following: $\hat{\vec{l}}_{u0\text{-}rs}^{u0}$ which is the fixed lever arm from the user0 frame to the rs frame resolved in the AINS user0 frame, and $\{\hat{\phi}_{u0}^{rs}, \hat{\theta}_{u0}^{rs}, \hat{\psi}_{u0}^{rs}\}$, which are the Tait-Bryan boresight angles between the user0 frame to the rs frame.

RI Sensor Data

The RI sensor(s) 270 can provide the following data at a single acquisition time that are used for the MRCG measurement: $S = \{\hat{\vec{s}}_1, \ldots, \hat{\vec{s}}_{n_S}\}$, which are RI data resolved in the ri frame; and $\{\hat{\phi}_{ri}, \hat{\theta}_{ri}, \hat{\psi}_{ri}\}$, which are Euler angles describing the orientation of the ri frame with respect to the rs frame reported by the RI sensor.

Aided INS Data

The INS solution interpolated to the RI data acquisition time can include the following components for measurement construction: $\{\hat{\lambda}_{u0}, \hat{L}_{u0}, \hat{h}_{u0}\}$, which are user0 frame origin geographic coordinates (latitude, longitude, altitude); and $\{\hat{\phi}_{u0}, \hat{\theta}_{u0}, \hat{\vartheta}_{u0}\}, \hat{\alpha}$, which are user0 Tait-Bryan angles (roll, pitch, platform heading) with respect to the INS wander azimuth frame and INS wander angle.

Keyframe Data

The following keyframe data can be obtained from the map database 292 corresponding to the keyframe nearest to the RI sensor Cartesian position $\hat{\vec{r}}_{rs}^{e}$: $\{\hat{\lambda}_{km}, \hat{L}_{km}, \hat{h}_{km}\}$, which are keyframe origin geographic coordinates (latitude, longitude, altitude); $\{\hat{\phi}_{km}, \hat{\theta}_{km}, \hat{\psi}_{km}\}$, which are keyframe Tait-Bryan angles (roll, pitch, heading with respect to the local North, East and Down directions); and $Q_{km} = \{\vec{q}_1, \ldots, \vec{q}_{n_Q}\}$, which is RI data with respect to the keyframe position resolved in the key (km) frame; wherein:

$$\hat{\vec{r}}_{rs}^{e} = \hat{\vec{r}}_{u0}^{e} + \hat{C}_{u0}^{e} \hat{\vec{l}}_{u0\text{-}rs}^{u0} \tag{22}$$

where $\hat{\vec{r}}_{u0}^{e}$ is the user0 frame Cartesian position computed from $\{\hat{\lambda}_{u0}, \hat{L}_{u0}, \hat{h}_{u0}\}$ and the AINS earth datum (e.g. World Geodetic System (WGS) 1984, International Terrestrial Reference System (ITRF) 2000), and $\hat{C}_{u0}^{e}$ is computed from $\{\hat{\lambda}_{u0}, \hat{L}_{u0}\}$ and $\{\hat{\phi}_{u0}, \hat{\theta}_{u0}, \hat{\vartheta}_{u0}\}, \hat{\alpha}$.

Preprocessing

Range Image Data Preparation

According to some embodiments, the following exemplary filtering actions can operate on the RI data S: decimation; return intensity thresholding; moving object recognition and removal; selected shapes, for example flat surfaces, cylinders and spheres; triangle meshing; surface smoothing; resampling; voxalization; and the like.

The choice of filtering actions can depend on a number of factors that include the RI sensor, number of points in the RI data and the scenes being imaged. The output of these actions is the prepared RI data $M = \{\vec{m}_1, \ldots, \vec{m}_{n_P}\}$.

A Priori Transformation

An a priori transformation $\hat{T}$ can include a translation and a rotation, as discussed above. The components of the a priori transformation $\hat{T}$ can be computed as follows.

Translation

The translation can be expressed as, $$\hat{\vec{t}}_{rs\text{-}km}^{km} = \hat{C}_{e}^{km} \Delta \hat{\vec{r}}_{km\text{-}u0}^{e} - \hat{C}_{u0}^{km} \hat{\vec{l}}_{u0rs}^{u0} \tag{23}$$

where $$\Delta \hat{\vec{r}}_{km\text{-}u0}^{e} = \hat{\vec{r}}_{km}^{e} - \hat{\vec{r}}_{u0}^{e}, \text{ and}$$

$$\hat{C}_{u0}^{km} = \hat{C}_{e}^{km} \hat{C}_{w}^{e} \hat{C}_{u0}^{w},$$

where $\hat{\vec{r}}_{u0}^{e}$ is the user0 Cartesian position in the earth frame computed from the user0 frame geographic coordinates $\{\hat{\lambda}_{u0}, \hat{L}_{u0}, \hat{h}_{u0}\}$; $\hat{\vec{r}}_{km}^{e}$ is the Cartesian position of the keyframe in the earth frame computed from the keyframe origin geographic coordinates $\{\hat{\lambda}_{km}, \hat{L}_{km}, \hat{h}_{km}\}$; $\hat{C}_{e}^{km}$ is the earth frame to keyframe DCM computed from $\{\hat{\lambda}_{km}, \hat{L}_{km}\}$ and $\hat{\psi}_{km}$ using Equation (2); $\hat{C}_{w}^{e}$ is the INS wander angle frame to earth frame DCM generated by the inertial navigator or computed from the INS solution position $\{\hat{\lambda}_{u0}, \hat{L}_{u0}, \hat{h}_{u0}\}$ and wander angle $\hat{\alpha}$ using Equation (2); and $\hat{C}_{u0}^{w}$ is the user0 frame to INS wander angle frame generated by the inertial navigator or are computed from the INS solution platform frame angles $\{\hat{\phi}_{u0}, \hat{\theta}_{u0}, \hat{\vartheta}_{u0}\}$ using Equation (2).

Rotation

The rotation can be expressed as, $$\hat{C}_{ri}^{km} = \hat{C}_{u0}^{km} \hat{C}_{rs}^{u0} \hat{C}_{ri}^{rs} \tag{24}$$

where $\hat{C}_{rs}^{u0}$ is the rs frame to user0 frame DCM computed from installation angles $\{\hat{\phi}_{u0}^{rs}, \hat{\theta}_{u0}^{rs}, \hat{\psi}_{u0}^{rs}\}$; and $\hat{C}_{ri}^{rs}$ is the ri frame to rs frame DCM generated by the RI sensor or computed from Euler angles $\{\hat{\phi}_{ri}, \hat{\theta}_{ri}, \hat{\psi}_{ri}\}$ reported by the RI sensor.

The a priori transformed range image $P=\{\vec{p}_1, \ldots, \vec{p}_{n_p}\}$ can be computed from the $n_P$ selected points in M using $\hat{T}$. Each element $\vec{p} \in P$ can be computed as follows, $$\vec{p}_i = \hat{T}\vec{m}_i = \hat{C}_{rs}^{km}\vec{m}_i + \vec{t}_{rs\text{-}km}^{km} \tag{25}$$

Nearest Neighbor Search

A nearest neighbor search (NNS) algorithm can be used to find the nearest neighbors in $Q_{km}$ to the points in P. These form a subset $Q_{nn}$ of $Q_{km}$, $$\vec{q}_j = \vec{q}_{nn}(\vec{p}_i) \in Q_{nn} \tag{26}$$

Surface Normal Vectors

Surface normal vectors are a by-product of voxelization or triangle meshing. Surface normal vectors can be computed at each point $\vec{q}_j \in Q_{nn}$:

$$\hat{\vec{n}}_j = \hat{\vec{n}}_Q(\vec{q}_j) \tag{27}$$

Measurement

The map registration cost gradient (MRCG) measurement is constructed as shown in Equation (19) and repeated here, $$\vec{z}_{MRCG} = \sum_{i=1}^{n_p} \left[ \vec{n}_j^T (\vec{p}_i - \vec{q}_j) \left[ \frac{\vec{n}_j}{\vec{p}_i \times \vec{n}_j} \right] \right], \tag{28}$$

where $\vec{p}_i$ is given by Equation (25), $\vec{q}_j$ is given by Equation (26) and $\hat{\vec{n}}_j$ is given by Equation (27).

Measurement Model

The MRCG measurement model can be expressed as, $$\vec{z}_{MRCG} = H_{MRCG}\hat{x}_{MREM} + \vec{\eta}_{MRCG} \tag{29}$$
$$R_{MRCG} = E[\vec{\eta}_{MRCG}\vec{\eta}_{MRCG}^T],$$

where $\hat{x}_{MREM}$ is a vector of correlated error states in an AINS estimator state vector given by, $$\hat{x}_{MREM} = [\delta \vec{r}_{u0}^c \vec{\psi}_{INS} \delta \vec{l}_{u0rs}^{u0} | \vec{\varphi}_{rs} \vec{\varphi}_{ri} \delta \vec{r}_{km}^g \vec{\varphi}_{km}]^T \tag{30}$$

where $\delta\vec{r}_{u0}^c$ and $\vec{\psi}_{INS}$ are the position and orientation error states resolved in the computed wander angle frame or the computer (c) frame in a psi-angle INS small azimuth error model.

$\delta\vec{l}_{u0\text{-}rs}^{u0}$ and $\vec{\varphi}_{rs}$ are the errors in the assumed RI sensor installation parameters. These are constant over time and hence can be modeled as random constant processes. $\vec{\varphi}_{ri}$ is the error in the captured range image frame orientation reported by the range sensor. It can range from a constant due to a calibration error to random noise due to sensed angle quantization limitations. This can depend on the range sensor's characteristics. $\delta\vec{r}_{km}^g$ and $\vec{\varphi}_{km}$ are the position and orientation errors of the keyframe with respect to the geographic frame at the map frame position.

$H_{MRCG}$ is a corresponding design matrix, which can be expressed as, $$H_{MRCG} = H_{ICP}H_{MREM} \tag{31}$$

where $H_{ICP}$ is the ICP state design matrix given by Equation (20) that maps the measurement into the residual transformation $\tilde{T}$ state vector $\hat{x}_T$ given by Equation (14), and is repeated here, $$H_{ICP} = -\sum_{i=1}^{n_p} \left[ \begin{array}{cc} \vec{n}_j\vec{n}_j^T & \vec{n}_j(\vec{p}_i \times \vec{n}_j)^T \\ (\vec{p}_i \times \vec{n}_j)\vec{n}_j^T & (\vec{p}_i \times \vec{n}_j)(\vec{p}_i \times \vec{n}_j)^T \end{array} \right], \tag{32}$$

$H_{MREM}$ is the design matrix that maps AINS estimator states $\hat{x}_{MRCG}$ given by Equation (30) into the residual transformation $\tilde{T}$ state vector $\hat{x}_T$ given by:

$$H_{MREM} = \left[ \begin{array}{cccccccc} \hat{C}_w^{km} & \hat{C}_w^{km}\left(\hat{C}_{u0}^w\hat{l}_{u0rs}^{u0}\times\right) & \hat{C}_{u0}^{km} & 0 & 0 & -\hat{C}_g^{km} & -\left(\hat{t}_{rskm}^{km}\times\right) \\ 0 & \hat{C}_w^{km} & 0 & -\hat{C}_{rs}^{km} & -\hat{C}_{ri}^{km} & 0 & I \end{array} \right], \tag{33}$$

$$\delta\vec{r}_{u0}^c \quad \vec{\psi}_{INS} \quad \delta\vec{l}_{u0rs}^{u0} \quad | \quad \vec{\varphi}_{rs} \quad \vec{\varphi}_{ri} \quad \delta\vec{r}_{km}^g \quad \vec{\varphi}_{km}$$

and $\vec{\eta}_{MRCG}$ is a vector of uncorrelated measurement noises with covariance $R_{MRCG}$ that model random deviations from optimality in the estimated $\tilde{T}$.

B. MRCG Measurement Construction Process

Figure 3:
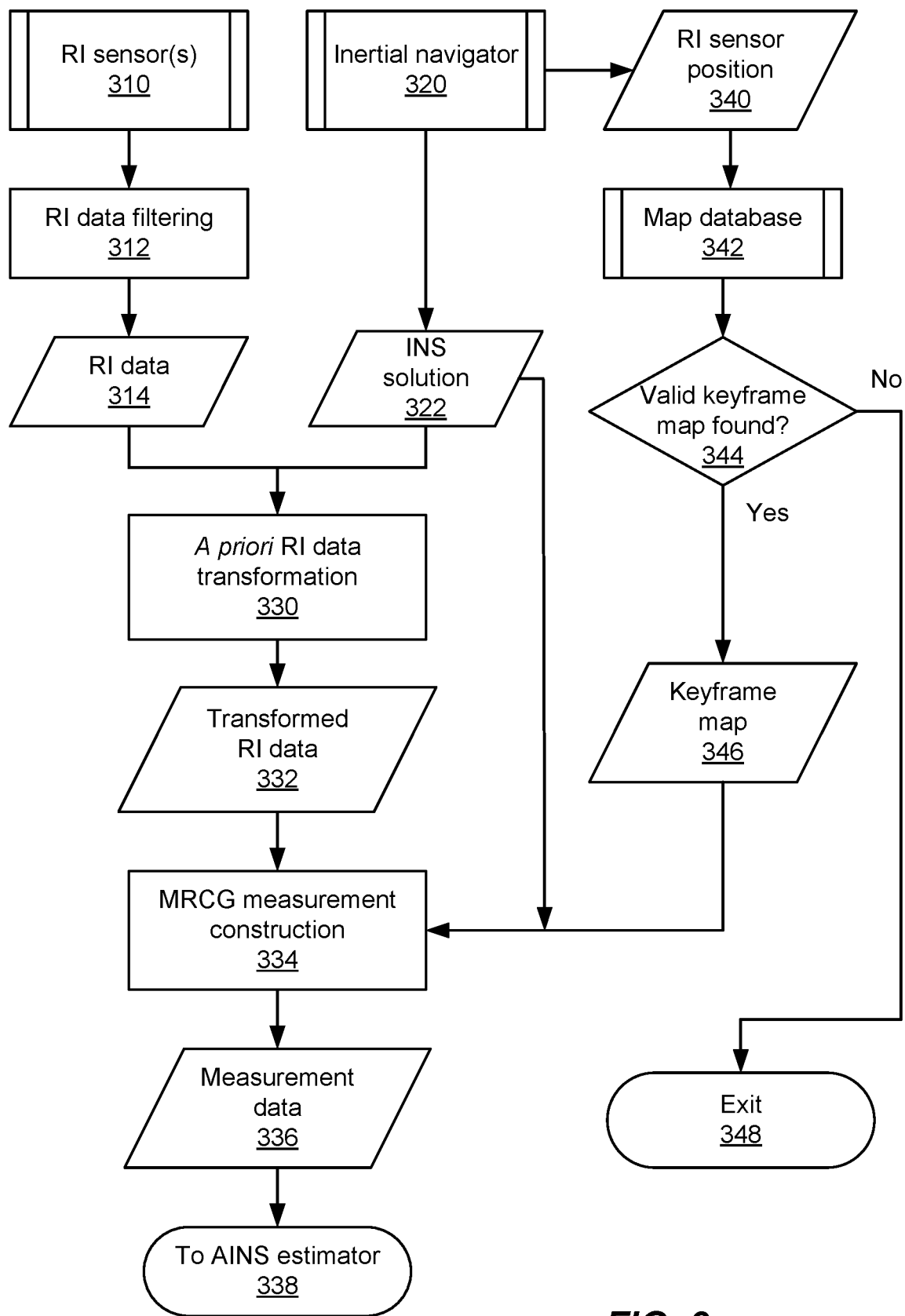
FIG. 3 shows an exemplary flowchart illustrating a map registration cost gradient (MRCG) measurement construction process according to some embodiments.

FIG. 3 shows an exemplary flowchart illustrating the MRCG measurement construction process that a computer or embedded processor can implement as part of a RI-AINS, according to some embodiments.

One or more RI sensors 310 can acquire raw RI data. At 312, the raw RI data can be filtered as described above. The resulting filtered RI data (referred herein as RI data) 314 are valid at the current measurement construction time.

The inertial navigator 320 that is part of the AINS shown in FIG. 2 (e.g., the INS 230) can provide an INS solution 322 that is also valid at the current measurement construction time. The INS solution 322 can be computed by interpolation of high-rate INS solutions valid at the IMU sampling times to the current measurement construction time.

At 340, the RI sensor position can be computed from the inertial navigator solution as described by Equation (22). The RI sensor position can be used to query the map database 342 for valid keyframe data at the RI sensor position, as described above. At the decision block 344, it can be determined whether the map database 342 contains valid keyframe data at the RI sensor position. If the map database 342 contains valid keyframe data at the RI sensor position, the keyframe data 346 can be used for the construction of the MRCG measurement at 334. If the map database 342 does not contain valid keyframe data at the RI sensor position, then the MRCG measurement construction process exits at 348.

At 330, an a priori transformation can be applied to the RI data 314 using the INS solution 322 to provide transformed RI data 332, as described above. The a priori transformed RI data 332 is approximately aligned with the keyframe data 346.

At 334, the MRCG measurement construction can use the transformed RI data 332, the INS solution 322, and the keyframe data 346 to construct the MRCG measurement data 336. According to some embodiments, the measurement construction process can include the following steps: (i) build a kd-tree using the transformed RI data 332 and the keyframe data 346 as described above, which can identify the nearest neighbor points in the keyframe map 346 to the points in the transformed RI data 332; (ii) compute the surface normal vectors for the nearest neighbor points as described above; (iii) construct the MRCG measurement $\hat{z}_{MRCG}$ given by Equation (28); (iv) construct the measurement model design matrix $H_{MRCG}$ given by Equations (31), (32), and (33); and (v) construct the measurement noise covariance $R_{MRCG}$ as described in Equation (29).

The MRCG measurement data 336 can be provided to the AINS estimator 338 (e.g., the AINS estimator 220 shown in FIG. 2) for measurement update processing, possibly with other constructed measurements from the AFM 210 shown in FIG. 2.

Figure 4:
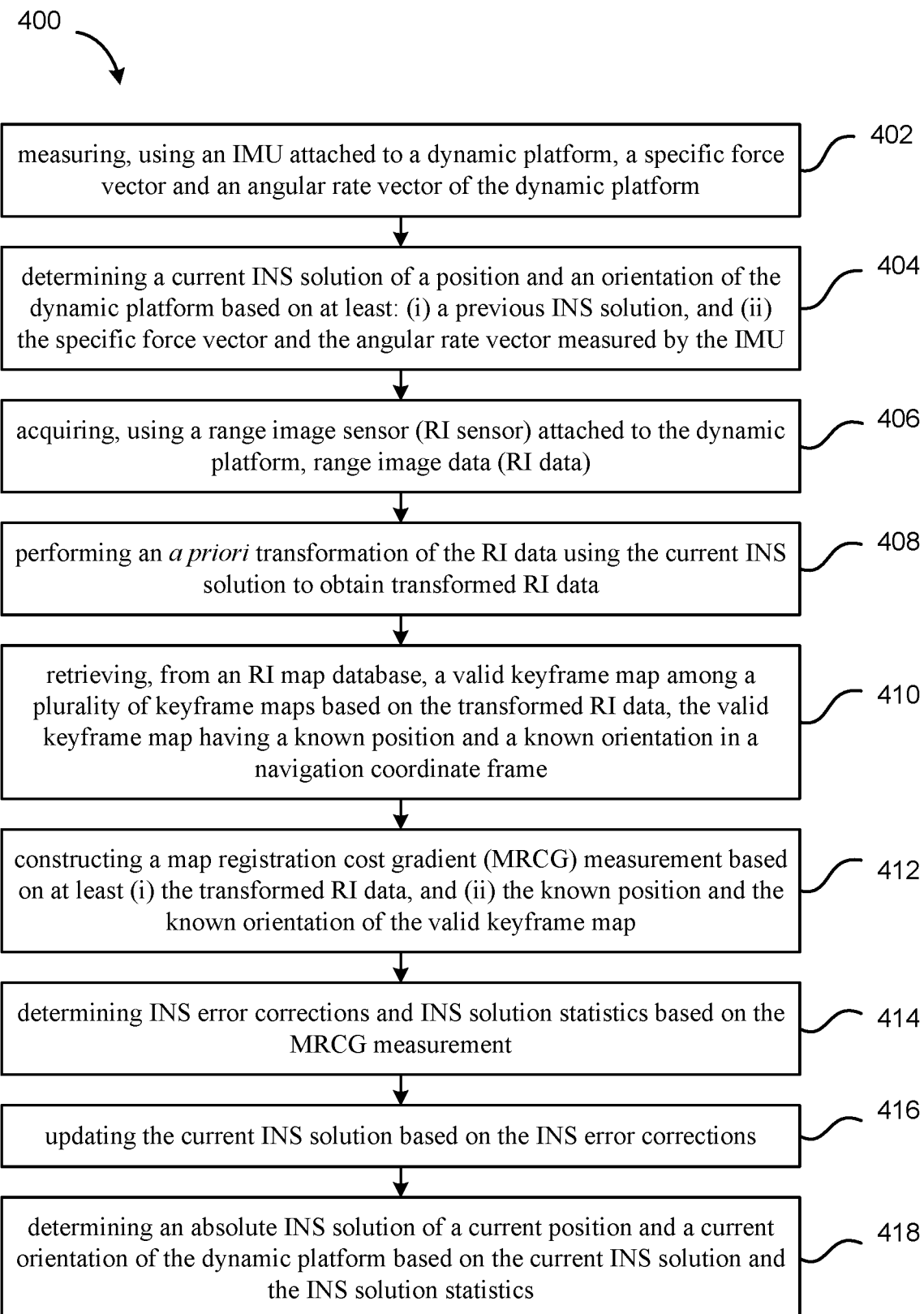
FIG. 4 shows a flowchart illustrating a method of navigation according to some embodiments.

FIG. 4 shows a flowchart illustrating a method 400 of navigation according to some embodiments.

The method 400 includes, at 402, measuring, using an IMU attached to a dynamic platform, a specific force vector and an angular rate vector of the dynamic platform; and at 404, determining a current INS solution of a position and an orientation of the dynamic platform based on at least: (i) a previous INS solution, and (ii) the specific force vector and the angular rate vector measured by the IMU.

The method 400 further includes, at 406, acquiring, using a range image sensor (RI sensor) attached to the dynamic platform, range image data (RI data); and at 408, performing an a priori transformation of the RI data using the current INS solution to obtain transformed RI data.

The method 400 further includes, at 410, retrieving, from an RI map database, a valid keyframe map among a plurality of keyframe maps based on the transformed RI data. The valid keyframe map has a known position and a known orientation in a navigation coordinate frame.

The method 400 further includes, at 412, constructing a map registration cost gradient (MRCG) measurement based on at least (i) the transformed RI data, and (ii) the known position and the known orientation of the valid keyframe map.

The method 400 further includes, at 414, determining INS error corrections and INS solution statistics based on the MRCG measurement; at 416, updating the current INS solution based on the INS error corrections; and at 418, determining an absolute INS solution of a current position and a current orientation of the dynamic platform based on the current INS solution and the INS solution statistics.

It should be appreciated that the specific steps illustrated in FIG. 4 provide a particular method of navigation according to some embodiments of the present invention. Other sequences of steps may also be performed according to alternative embodiments. For example, alternative embodiments of the present invention may perform the steps outlined above in a different order. Moreover, the individual steps illustrated in FIG. 4 may include multiple sub-steps that may be performed in various sequences as appropriate to the individual step. Furthermore, additional steps may be added or removed depending on the particular applications. One of ordinary skill in the art would recognize many variations, modifications, and alternatives.

Figure 5:
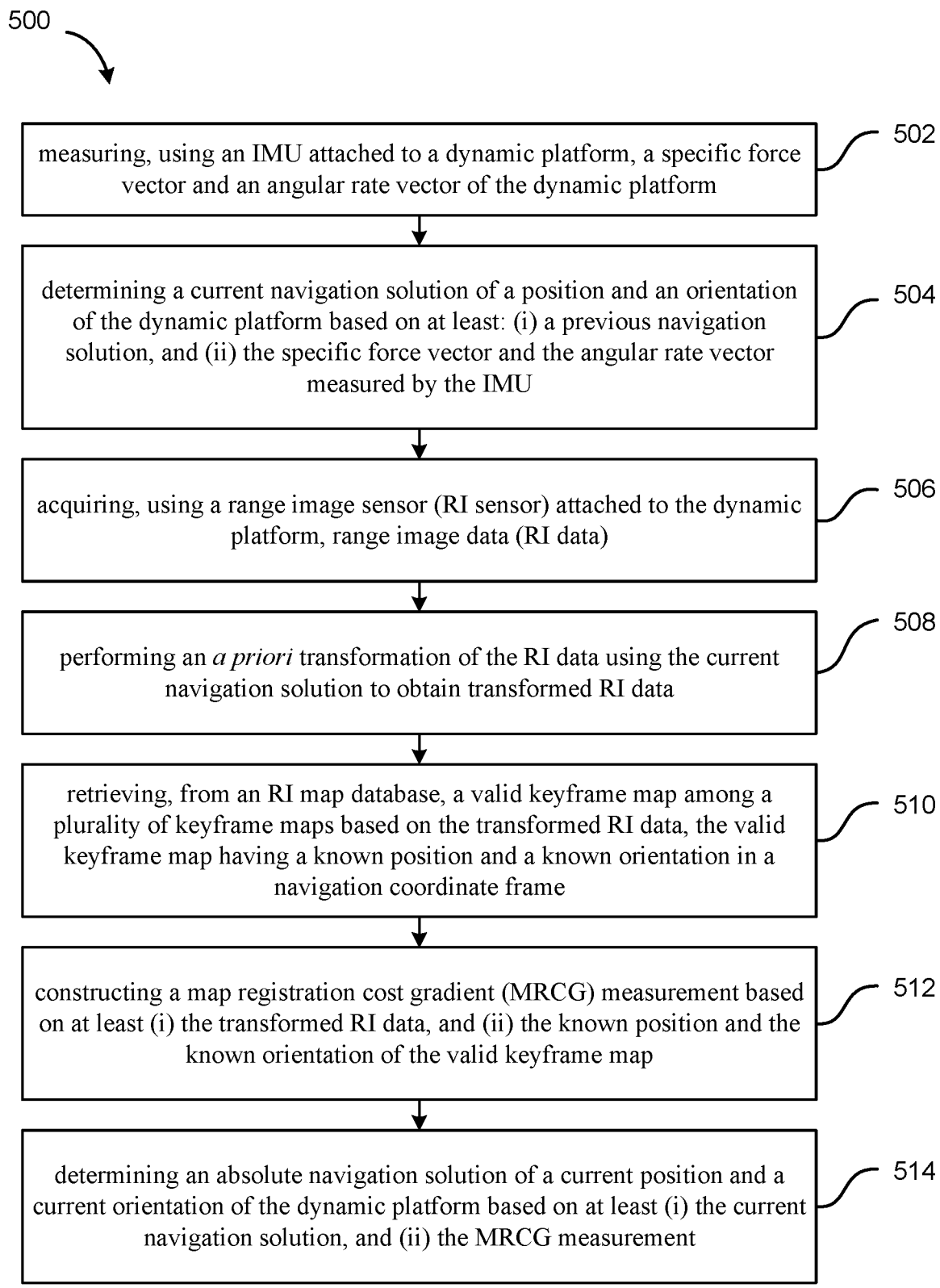
FIG. 5 shows a flowchart illustrating a method of navigation according to some embodiments.

FIG. 5 shows a flowchart illustrating a method 500 of navigation according to some embodiments.

The method 500 includes, at 502, measuring, using an IMU attached to a dynamic platform, a specific force vector and an angular rate vector of the dynamic platform; and at 504, determining a current navigation solution of a position and an orientation of the dynamic platform based on at least: (i) a previous navigation solution, and (ii) the specific force vector and the angular rate vector measured by the IMU.

The method 500 further includes, at 506, acquiring, using a range image sensor (RI sensor) attached to the dynamic platform, range image data (RI data); and at 508, performing an a priori transformation of the RI data using the current navigation solution to obtain transformed RI data.

The method 500 further includes, at 510, retrieving, from an RI map database, a valid keyframe map among a plurality of keyframe maps based on the transformed RI data. The valid keyframe map has a known position and a known orientation in a navigation coordinate frame.

The method 500 further includes, at 512, constructing a map registration cost gradient (MRCG) measurement based on at least (i) the transformed RI data, and (ii) the known position and the known orientation of the valid keyframe map.

The method 500 further includes, at 514, determining an absolute navigation solution of a current position and a current orientation of the dynamic platform based on at least (i) the current navigation solution, and (ii) the MRCG measurement.

It should be appreciated that the specific steps illustrated in FIG. 5 provide a particular method of navigation according to some embodiments of the present invention. Other sequences of steps may also be performed according to alternative embodiments. For example, alternative embodiments of the present invention may perform the steps outlined above in a different order. Moreover, the individual steps illustrated in FIG. 5 may include multiple sub-steps that may be performed in various sequences as appropriate to the individual step. Furthermore, additional steps may be added or removed depending on the particular applications. One of ordinary skill in the art would recognize many variations, modifications, and alternatives.

II. Tightly Coupled Range Image Delta Pose Aided INS

Figure 6A:
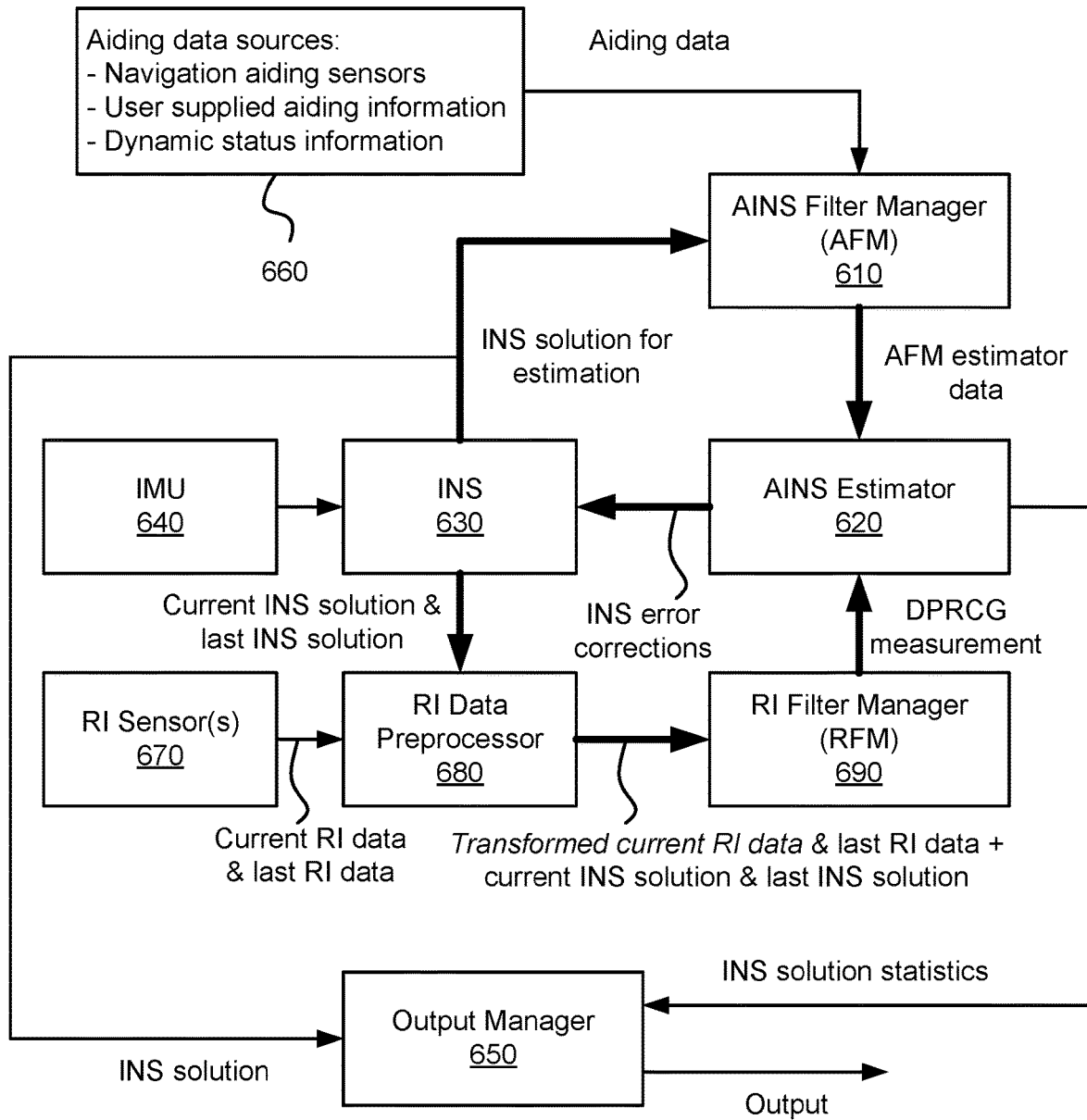
FIG. 6A shows an exemplary RI aided INS architecture configured for tightly coupled delta pose aiding according to some embodiments.

FIG. 6A shows an exemplary RI-AINS architecture configured for tightly coupled range image delta pose aided INS according to some embodiments. The aiding data sources 660, the IMU 640, the INS 630, the AFM 610, and the AINS estimator 620 are similar to the aiding data sources 160, the IMU 140, the INS 130, the AFM 110, and the AINS estimator 120, as shown in FIG. 1A and described above. The RI sensor(s) 670 are similar to the RI sensor(s) 270 in FIG. 2A, as described above.

According to some embodiments, the RI data preprocessor 680 can compute the following data items from the received RI data and the INS solution interpolated to the RI capture epoch: (i) data reduction, resampling, and voxelization; (ii) a priori transformation of the RI data using the INS solution; (iii) surface normal vectors; and (iv) nearest neighbor kd-tree construction for the current RI data.

The RFM 690 receives the filtered and a priori transformed RI data and the kd-tree from the RI data preprocessor 680. From these information, the RFM 690 can construct the following measurement update data for the AINS estimator 620: (i) delta pose registration cost gradient (DPRCG) measurement; and (ii) state reset data related to DPRCG measurements.

Figure 6B:
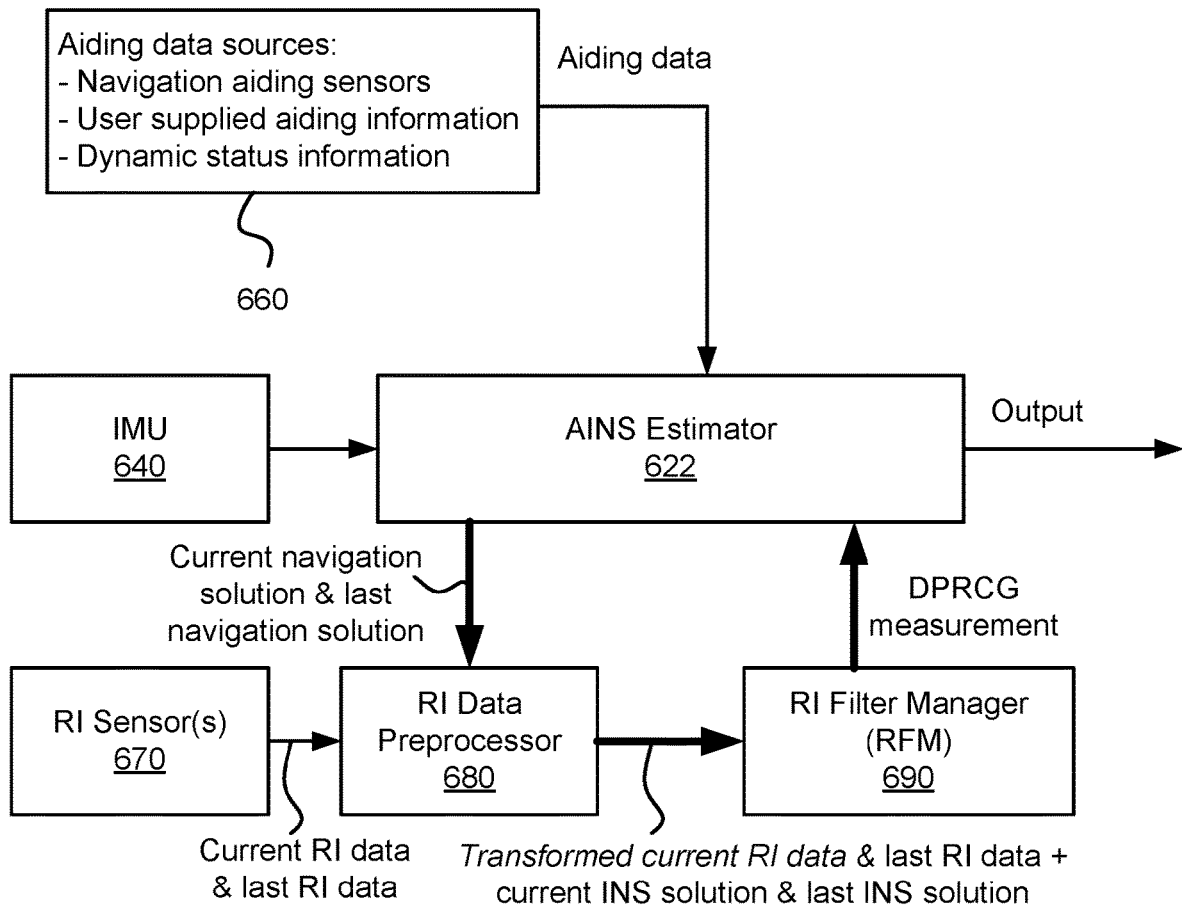
FIG. 6B shows another exemplary RI aided INS architecture configured for tightly coupled delta pose aiding according to some embodiments.

FIG. 6B shows an exemplary generalization of the RI-AINS architecture configured for tightly coupled delta pose aiding according to some embodiments. In the RI-AINS architecture shown in FIG. 6B, a navigation estimator 622 can estimate the navigation solution and compute the navigation solution statistics using data from the IMU 640, the aiding data from the aiding sensors 660, and the DPRCG measurement data from the RFM 690. In some embodiments, the navigation estimator 622 can comprise the INS 630, the AFM 610, and the AINS estimator 620 as shown in FIG. 6A. In some alternative embodiments, the navigation estimator 622 can comprise an estimation process in which the navigation solution is part of an estimated state, and can construct measurements from data obtained from the IMU 640, aiding data from the aiding sensors 660, and the DPRCG measurement data from the RFM 690, and with these measurements can perform measurement updates of the estimated state. The estimation process used by the navigation estimator 622 can comprise, for example, a Kalman filter, a nonlinear filter, a particle filter, or the like.

A. Delta Pose Registration Cost Gradient Measurement

According to some embodiments, the DPRCG measurement can be Equation (21) cast as a measurement in the AINS estimator 620. The RI data used to construct the measurement can be the current range image and the previous range image transformed to an approximate alignment with the current range image using the a priori AINS position and orientation solution. The DPRGC measurement model can relate the INS velocity and orientation errors to the residual transformation $\tilde{T}$ state vector $\overset{\Delta}{x}_{\tilde{T}}$ given by Equation (14), thereby causing the DPRCG measurement to observe these INS errors and the INS error regulation feedback loop to effectively generate an ICP solution. This is a tightly coupled measurement that is computed from the RI data directly without an intermediary estimation step, as discussed above.

Input Data

The input data to the RFM 690 can include installation parameters, RI sensor data, previous prepared RI data, aided INS data, and the like.

Installation Parameters

The installation parameters are similar to those described above in the previous section relating to tightly coupled range image map based localization aided INS.

RI Sensor Data and Previous Prepared RI Data

The RI data is similar to that described above in the previous section. The RI data can arrive at imaging epoch k with epoch times separated by epoch duration $\Delta t_k$. Previous prepared RI data M(k−1) is valid at the previous imaging epoch k−1.

Aided INS Data

The INS solution interpolated to the RI data acquisition times can contain the following components for measurement construction: $\{\hat{\lambda}_{u0}, \hat{L}_{u0}, \hat{h}_{u0}\}$, which are user0 frame origin geographic coordinates (latitude, longitude, altitude); $\hat{v}_{u0}^w$, which is user0 frame velocity resolved in the wander angle frame; and $\{\hat{\phi}_{u0}, \hat{\theta}_{u0}, \hat{\vartheta}_{u0}\}, \hat{\alpha}$, which are user0 Tait-Bryan angles (roll, pitch, platform heading) with respect to the INS wander azimuth frame and INS wander angle.

Preprocessing

Range Image Data Preparation

According to some embodiments, the following filtering actions can operate on the RI data S: decimation; return intensity thresholding; moving object recognition and removal; selected shapes, for example flat surfaces, cylinders and spheres; triangle meshing; surface smoothing; resampling; voxalization; and the like. The result is RI data M(k) computed from S(k).

A Priori Transformation

The a priori transformation $\hat{T}$ includes a translation and a rotation that brings the previous range image M(k−1) into approximate alignment with the current range image M(k). The translation can be expressed as, $$\bar{t}_{rs(k-1)\text{-}rs(k)}^{ri(k)} = C_e^{ri}(k)\Delta \bar{t}_{u0\text{-}rs}^{e}(k) \quad (34)$$

where $$C_e^{ri}(k) = C_{rs}^{ri}(k)C_{u0}^{rs}C_e^{u0}(k) \quad (35)$$

$$\Delta \bar{t}_{u0\text{-}rs}^{e}(k) = \Delta \vec{r}_{u0}^{e}(k) + \Delta C_{u0}^{e}(k)\bar{l}_{u0\text{-}rs}^{u0} \quad (36)$$

$$\Delta \vec{r}_{u0}^{e}(k) = \vec{r}_{u0}^{e}(k) - \vec{r}_{u0}^{e}(k-1) \quad (37)$$

$$\Delta C_{u0}^{e}(k) = C_{u0}^{e}(k) - C_{u0}^{e}(k-1) \quad (38)$$

The rotation can be expressed as, $$C_{ri(k-1)}^{ri(k)} = C_e^{ri}(k)C_{ri}^{e}(k-1) = C_e^{ri}(k)(C_e^{ri}(k-1))^T \quad (39)$$

The a priori transformed range image $P = \{\bar{p}_1, \ldots, \bar{p}_{n_P}\}$ can then be computed from the $n_P$ selected points in M(k−1) using $\hat{T}$, $$\bar{p}_i = C_{ri(k-1)}^{ri(k)} \vec{m}_i(k-1) + \bar{t}_{rs(k-1)\text{-}rs(k)}^{ri(k)} \quad (40)$$

Nearest Neighbor Search

A nearest neighbor search (NNS) algorithm can be used to build a kd-tree that yields the nearest neighbors in Q=M(k) to the points in P. These form a subset $Q_{nn}$ of M(k), $$\bar{q}_j = \bar{q}_{nn}(\bar{p}_i) \in Q_{nn} \quad (41)$$

Surface Normal Vectors

Surface normal vectors can be computed as described above in the previous section relating to tightly coupled range image map based localization aided INS.

Measurement

According to some embodiments, the delta pose registration cost gradient (DPRCG) measurement can be constructed as shown in Equation (19) and repeated here, $$z_{DPRCG} = \sum_{i=1}^{n_p}\left[\bar{n}_j^T(\bar{p}_i - \bar{q}_j)\left[\frac{\bar{n}_j}{\bar{p}_i \times \bar{n}_j}\right]\right], \quad (42)$$

where $\bar{p}_i$ is given by Equation (40), $\bar{q}_j$ is given by Equation (41), and $\bar{n}_j$ is given by Equation (27).

Measurement Model

According to some embodiments, the DPRCG measurement model can be expressed as, $$z_{DPRCG} = H_{DPRCG}\overset{\Delta}{x}_{DPREM} + \bar{\eta}_{DPRCG} \quad (43)$$
$$R_{DPRCG} = E[\bar{\eta}_{DPRCG}\bar{\eta}_{DPRCG}^T],$$

where, $\overset{\Delta}{x}_{DPREM}$ is a vector of correlated error states in an AINS estimator state vector given by $$\overset{\Delta}{x}_{DPREM} = [\delta \bar{\psi}_{u0}^c \bar{v}_{INS}|\delta \bar{l}_{u0\text{-}rs}^{u0} \bar{\phi}_{rs} \bar{\phi}_i]^T \quad (44)$$

$\delta \bar{v}_{u0}^c(k)$ is the INS velocity error resolved in the computer frame in the psi-angle error model. The remaining elements have been described in the previous section relating to tightly coupled range image map based localization aided INS.

$H_{DPRCG}$ is a corresponding design matrix, which includes, $$H_{DPRCG} = H_{ICP}H_{DPREM} \quad (45)$$

$H_{ICP}$ is the ICP state design matrix given by Equation (32). $H_{DPREM}$ is the design matrix derived from Equation (86) that maps $\hat{\vec{x}}_{DPRCG}$ into $\hat{\vec{x}}_T$:

$$H_{DPREM} = \begin{bmatrix} \hat{C}_w^{ri} \Delta t_k & -\left(\Delta \hat{t}_{u0-rs}^{ri} \times\right) \hat{C}_w^{ri} & -\hat{C}_e^{ri} \Delta \hat{C}_{u0}^e & \left(\Delta \hat{t}_{u0-rs}^{ri} \times\right) \hat{C}_{rs}^{ri} & \left(\Delta \hat{t}_{u0-rs}^{ri} \times\right) \\ 0 & 0 & 0 & 0 & 0 \end{bmatrix}, \quad (46)$$

$$\delta \vec{v}_{u0}^e \quad \vec{\psi}_{INS} \quad \delta \vec{t}_{u0-rs}^{u0} \quad \vec{\varphi}_{rs} \quad \vec{\varphi}_i$$

where $\vec{\eta}_{DPRCG}$ is a vector of uncorrelated measurement noises with covariance $R_{DPRCG}$ that model random deviations from optimality in the estimated $\tilde{T}$.

B. DPRCG Measurement Construction Process

Figure 7:
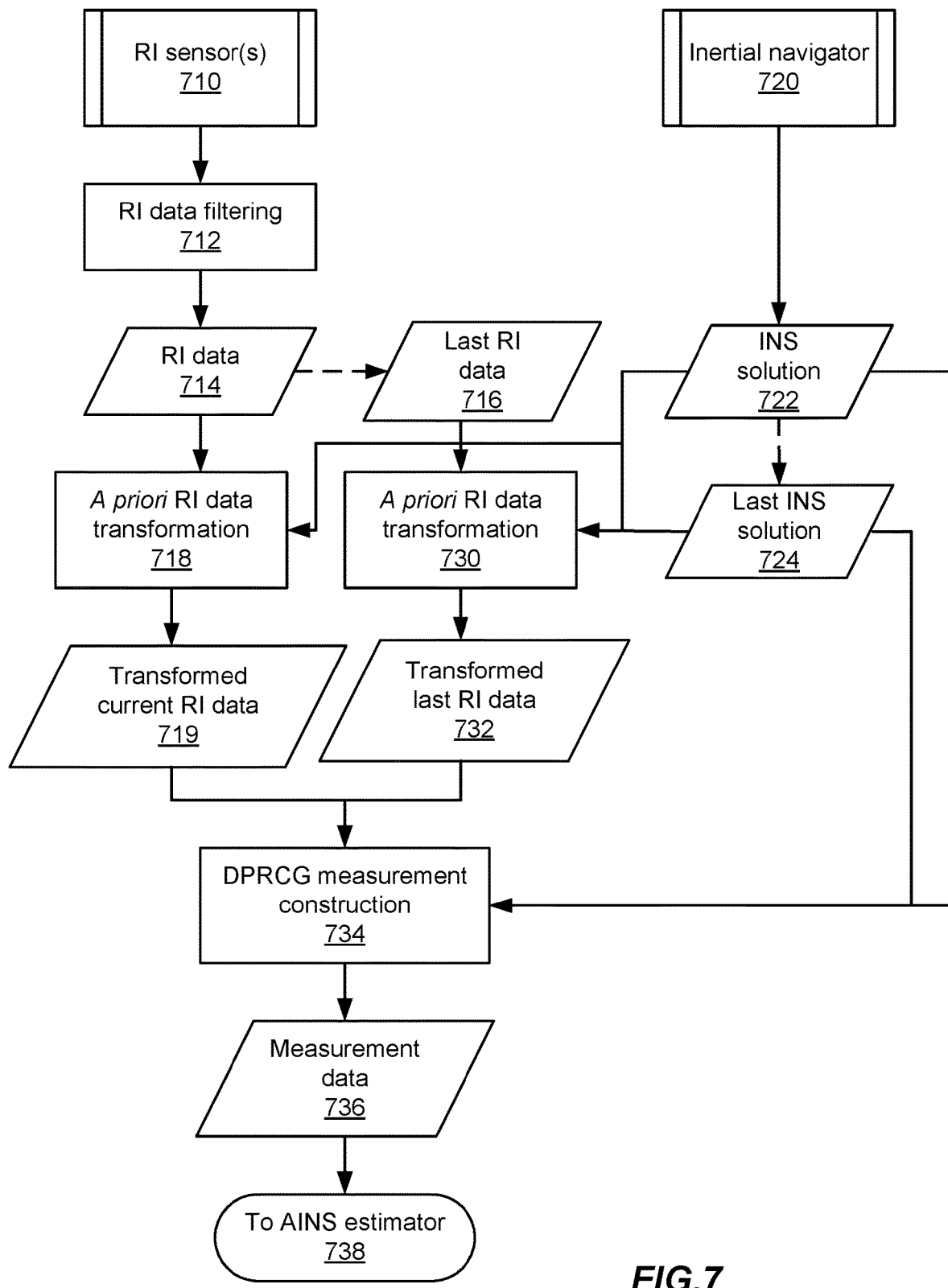
FIG. 7 shows an exemplary flowchart illustrating a delta pose registration cost gradient (DPRCG) measurement construction process according to some embodiments.

FIG. 7 shows an exemplary flowchart illustrating the DPRCG measurement construction process that a computer or embedded processor can implement as part of a RI-AINS, according to some embodiments.

One or more RI sensors 710 can acquire RI data. At 712, the RI data can be filtered as described above. The resulting filtered RI data (referred herein as RI data) 714 are valid at the current measurement construction time.

The inertial navigator 720 that is part of the AINS shown in FIG. 6A (e.g., the INS 630) can provide an INS solution 722 that is also valid at the current measurement construction time. The INS solution 722 can be computed by interpolation of high-rate INS solutions valid at the IMU sampling times to the current measurement construction time.

The last RI data 716 is the filtered RI data valid at the previous or last measurement construction time. The dashed line indicates storage of the current RI data 714 to be used as last RI data 716 at the next measurement construction time.

The last INS solution 724 is the INS solution at the previous or last measurement construction time. The dashed line indicates storage of the current INS solution 722 to be used as the last INS solution 724 at the next measurement construction time.

At 730, an a priori transformation can be applied to the last RI data 716 using the current INS solution 722 and the last INS solution 724 to compute the transformed last RI data 732 from the last RI data 716 as described above. The transformed last RI data 732 is approximately aligned with the current RI data 714. $\Delta \vec{r}_{u0}^e(k)$ in Equation (37), $\Delta C_{u0}^e(k)$ in Equation (38), and $C_{ri(k-1)}^{ri(k)}$ in Equation (39) are computed from the current INS solution 722 and the last INS solution 724.

At 718, an a priori transformation can be applied to the current RI data 714 using the current INS solution 722 to compute the transformed current RI data 719.

At 734, the DPRGC measurement construction can use the transformed current RI data 719, the transformed last RI data 732, the current INS solution 722, and the last INS solution 724, to construct the DPRCG measurement data 736. According to some embodiments, the measurement construction process can include the following steps: (i) perform a nearest neighbor search using the current RI data 714 and the a priori transformed last RI data 732 as described above, which can identify the nearest neighbor points in the current RI data 714 to the points in the a priori transformed last RI data 732; (ii) compute the surface normal vectors for the nearest neighbor points as described above; (iii) construct the DPRCG measurement $\hat{\vec{z}}_{DPRCG}$ given by Equation (42); (iv) construct the measurement model design matrix $H_{DPRCG}$ given by Equations (45) and (46), wherein $H_{DPREM}$ in Equation (46) uses the current INS solution 722 and the last INS solution 724 to compute the delta terms $\Delta \hat{t}_{u0-rs}^{ri}$ and $\Delta \hat{C}_{u0}^e$; and (v) construct the measurement noise covariance $R_{MRCG}$ as described in Equation (43).

The DPRCG measurement data 736 can be provided to the AINS estimator 738 (e.g., the AINS estimator 620 shown in FIG. 6A) for measurement update processing, possibly with other constructed measurements from the AFM 610 shown in FIG. 6A.

Figure 8:
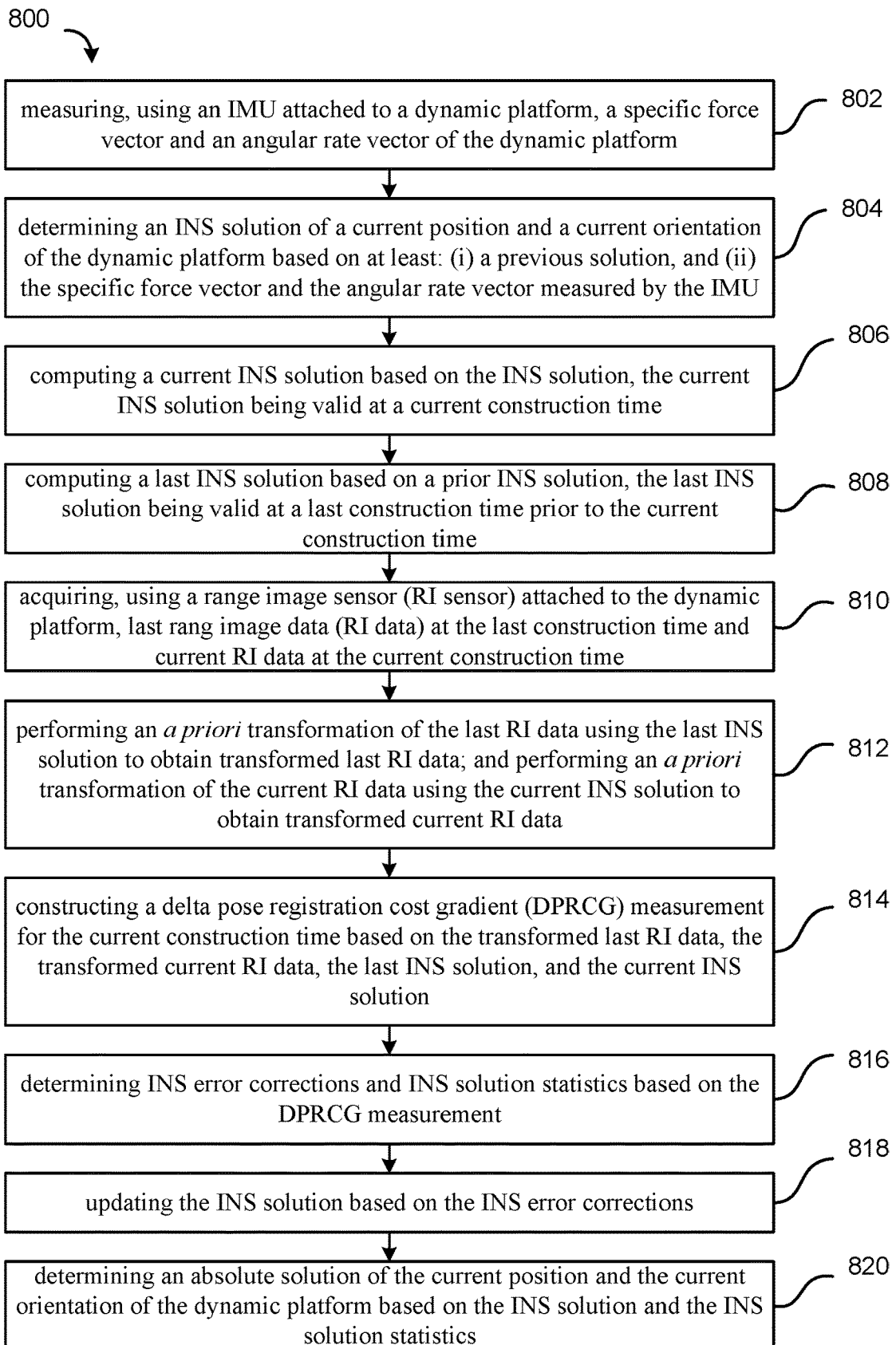
FIG. 8 shows a flowchart illustrating a method of navigation according to some embodiments.

FIG. 8 shows a flowchart illustrating a method 800 of navigation according to some embodiments.

The method 800 includes, at 802, measuring, using an IMU attached to a dynamic platform, a specific force vector and an angular rate vector of the dynamic platform; and at 804, determining an INS solution of a current position and a current orientation of the dynamic platform based on at least: (i) a previous solution, and (ii) the specific force vector and the angular rate vector measured by the IMU.

The method 800 further includes, at 806, computing a current INS solution based on the INS solution, the current INS solution being valid at a current construction time; and at 808, computing a last INS solution based on a prior INS solution, the last INS solution being valid at a last construction time prior to the current construction time.

The method 800 further includes, at 810, acquiring, using a range image sensor (RI sensor) attached to the dynamic platform, last rang image data (RI data) at the last construction time and current RI data at the current construction time; and at 812, performing an a priori transformation of the last RI data using the last INS solution to obtain transformed last RI data, and performing an a priori transformation of the current RI data using the current INS solution to obtain transformed current RI data.

The method 800 further includes, at 814, constructing a delta pose registration cost gradient (DPRCG) measurement for the current construction time based on the transformed last RI data, the transformed current RI data, the last INS solution, and the current INS solution; and at 816, determining INS error corrections and INS solution statistics based on the DPRCG measurement.

The method 800 further includes, at 818, updating the INS solution based on the INS error corrections; and at 820, determining an absolute solution of the current position and the current orientation of the dynamic platform based on the INS solution and the INS solution statistics.

It should be appreciated that the specific steps illustrated in FIG. 8 provide a particular method of navigation according to some embodiments of the present invention. Other sequences of steps may also be performed according to alternative embodiments. For example, alternative embodiments of the present invention may perform the steps outlined above in a different order. Moreover, the individual steps illustrated in FIG. 8 may include multiple sub-steps that may be performed in various sequences as appropriate to the individual step. Furthermore, additional steps may be added or removed depending on the particular applications. One of ordinary skill in the art would recognize many variations, modifications, and alternatives.

Figure 9:
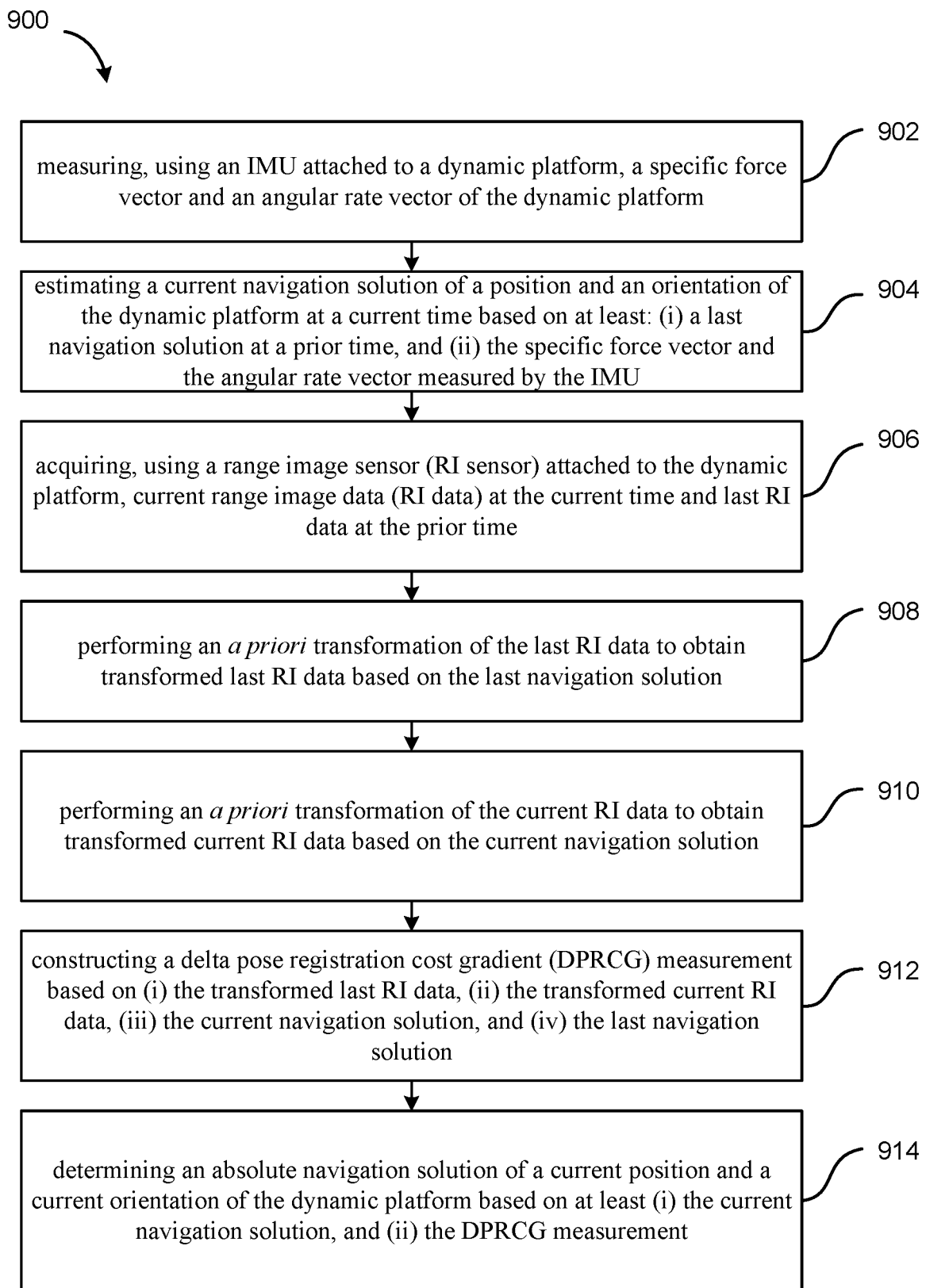
FIG. 9 shows a flowchart illustrating a method of navigation according to some embodiments.

FIG. 9 shows a flowchart illustrating a method 900 of navigation according to some embodiments.

The method 900 includes, at 902, measuring, using an IMU attached to a dynamic platform, a specific force vector and an angular rate vector of the dynamic platform; and at 904, estimating a current navigation solution of a position and an orientation of the dynamic platform at a current time based on at least: (i) a last navigation solution at a prior time, and (ii) the specific force vector and the angular rate vector measured by the IMU.

The method 900 further includes, at 906, acquiring, using a range image sensor (RI sensor) attached to the dynamic platform, current range image data (RI data) at the current time and last RI data at the prior time; at 908, performing an a priori transformation of the last RI data to obtain transformed last RI data based on the last navigation solution; and at 910, performing an a priori transformation of the current RI data to obtain transformed current RI data based on the current navigation solution.

The method 900 includes, at 912, constructing a delta pose registration cost gradient (DPRCG) measurement based on (i) the transformed last RI data, (ii) the transformed current RI data, (iii) the current navigation solution, and (iv) the last navigation solution; and at 914, determining an absolute navigation solution of a current position and a current orientation of the dynamic platform based on at least (i) the current navigation solution, and (ii) the DPRCG measurement.

It should be appreciated that the specific steps illustrated in FIG. 9 provide a particular method of navigation according to some embodiments of the present invention. Other sequences of steps may also be performed according to alternative embodiments. For example, alternative embodiments of the present invention may perform the steps outlined above in a different order. Moreover, the individual steps illustrated in FIG. 9 may include multiple sub-steps that may be performed in various sequences as appropriate to the individual step. Furthermore, additional steps may be added or removed depending on the particular applications. One of ordinary skill in the art would recognize many variations, modifications, and alternatives.

III. Estimator Measurement Model Derivations

The a priori transformation translation in Equation (23) and rotation in Equation (24) may not be error-free, as they are computed from erroneous data and therefore can be cast as perturbed quantities. This section describes the mathematical derivations of the RI registration cost gradient measurement models that result from the perturbation analysis.

A. Identities
Cross Product Rotation Invariance

The cross-product is invariant under rotations about its axes. Thus, $$\vec{\phi}^a \times \vec{\hat{x}}^a = C_b^a (\vec{\phi}^b \times \vec{\hat{x}}^b) = (\vec{\phi}^a \times) C_b^a \vec{\hat{x}}^b,$$

for arbitrary $\vec{\hat{x}}^b$ implies, $$C_b^a (\vec{\phi}^b \times) = (\vec{\phi}^a \times) C_b^a \quad (47)$$

Erroneous DCM Perturbation Models

An erroneous DCM can be cast as the product of a correct DCM and a small erroneous rotation angle DCM according to the following DCM perturbation rules. The c frame in each case describes a computed frame that differs from the corresponding true a or b frame by a small rotation vector:

$$\hat{C}_a^b = C_a^c = C_b^c C_a^b \cong (I - (\vec{\varphi}_{bc} \times)) C_a^b \Rightarrow C_a^b \cong (I + (\vec{\varphi}_{bc} \times)) \hat{C}_a^b \quad (48)$$

$$\hat{C}_a^b = C_c^b = C_a^b C_c^a \cong C_a^b (I + (\vec{\varphi}_{ac} \times)) \Rightarrow C_a^b \cong \hat{C}_a^b (I - (\vec{\varphi}_{ac} \times))$$

Cross Product Matrix Time Difference

The cross product matrix time difference can be expressed as, $$(\vec{\hat{x}}^{a(k)} \times) C_{a(k-1)}^{a(k)} - C_{a(k-1)}^{a(k)} (\vec{\hat{x}}^{a(k-1)} \times) = (\Delta \vec{\hat{x}}^{a(k)} \times) C_{a(k-1)}^{a(k)} \quad (49)$$

where $$\Delta \vec{\hat{x}}^{a(k)} = \vec{\hat{x}}^{a(k)} - C_{a(k-1)}^{a(k)} \vec{\hat{x}}^{a(k-1)}$$

$$= \vec{\hat{x}}^{a(k)}(k) - \vec{\hat{x}}^{a(k)}(k-1).$$

Vector Cross Product Time Difference

The vector cross product time difference can be expressed as, $$\vec{\hat{x}}^{a(k)} \times \vec{y}^{a(k)} - C_{a(k-1)}^{a(k)} (\vec{\hat{x}}^{a(k-1)} \times \vec{y}^{a(k-1)}) = \Delta(\vec{\hat{x}}^{a(k)} \times \vec{y}^{a(k)}) \quad (50)$$

where $$\Delta(\vec{\hat{x}}^{a(k)} \times \vec{y}^{a(k)}) = \vec{\hat{x}}^{a(k)} \times \vec{y}^{a(k)} - (C_{a(k-1)}^{a(k)} \vec{\hat{x}}^{a(k-1)}) \times (C_{a(k-1)}^{a(k)} \vec{y}^{a(k-1)})$$

$$= \vec{\hat{x}}^{a(k)}(k) \times \vec{y}^{a(k)}(k) - \vec{\hat{x}}^{a(k)}(k-1) \times \vec{y}^{a(k)}(k-1).$$

B. Map Registration Cost Gradient Measurement Model
A Priori Rotation Error

Equation (48) applied to the components of Equation (24) can result in the following definitions of error angle vectors:

$$C_e^{km} \cong (I + (\vec{\varphi}_{km} \times)) \hat{C}_e^{km}, \quad (51)$$

$$C_w^e \cong \hat{C}_w^e (I - (\delta \vec{\theta}_{INS} \times))$$

$$C_{u0}^w \cong (I + (\vec{\phi}_{INS} \times)) \hat{C}_{u0}^w$$

$$C_{rs}^{u0} \cong \hat{C}_{rs}^{u0} (I - (\vec{\varphi}_{rs} \times))$$

$$C_{ri}^{rs} \cong \hat{C}_{ri}^{rs} (I - (\phi_{ri} \times))$$

where the angle perturbations $\vec{\varphi}_{km}$, $\vec{\varphi}_{rs}$, $\varphi_{ri}$ are described above.

The INS alignment error can be partitioned as $\vec{\phi}_{INS} = \vec{\psi}_{INS} + \vec{\theta}_{INS}$. Thus, $$C_w^e C_{u0}^w \cong \hat{C}_w^e (I - (\delta \vec{\theta}_{INS} \times))(I + (\vec{\phi}_{INS} \times)) \hat{C}_{u0}^w. \quad (52)$$

$$\hat{C}_w^e (I + (\vec{\psi}_{INS} \times)) \hat{C}_{u0}^w$$

Equations (51) and (52) can be substituted into Equation (24). Equation (47) and deletion of products of angle perturbations can result in, $$C_{ri}^{km} \cong (I + (\vec{\varphi}_{km} \times)) \hat{C}_e^{km} \hat{C}_w^e (I - (\delta \vec{\theta}_{INS} \times))(I + \quad (53)$$

$$(\vec{\phi}_{INS} \times)) \hat{C}_{u0}^w \hat{C}_{rs}^{u0} (I - (\vec{\varphi}_{rs} \times)) \hat{C}_{ri}^{rs} (I - (\vec{\varphi}_{ri} \times))$$

-continued $$\cong \hat{C}_{ri}^{km} + (\vec{\varphi}_{km} \times)\hat{C}_{ri}^{km} + \hat{C}_{w}^{km}(\vec{\psi}_{INS} \times)\hat{C}_{ri}^{w} - \hat{C}_{rs}^{km}(\vec{\varphi}_{rs} \times)\hat{C}_{ri}^{rs} -$$

$$\hat{C}_{ri}^{km}(\vec{\varphi}_{ri} \times)$$

$$= \hat{C}_{ri}^{km} + (\vec{\varphi}_{km} \times)\hat{C}_{ri}^{km} + (\hat{C}_{w}^{km}\vec{\psi}_{INS} \times)$$

$$\hat{C}_{ri}^{km} - (\hat{C}_{rs}^{km}\vec{\varphi}_{rs} \times)\hat{C}_{ri}^{km} - (\hat{C}_{ri}^{km}\vec{\varphi}_{ri} \times)\hat{C}_{ri}^{km}$$

Equation (53) can be cast in terms of a single rotation error angle $\vec{\phi}_T$ so that it resembles Equation (11):

$$C_{ri}^{km} \cong (I + (\vec{\phi}_T \times))\hat{C}_{ri}^{km} \tag{54}$$

where $$\vec{\phi}_T = \vec{\varphi}_{km} + \hat{C}_w^{km}\vec{\varphi}_{INS} - \hat{C}_{rs}^{km}\vec{\varphi}_{rs} - \hat{C}_{ri}^{km}\vec{\varphi}_{ri} \tag{55}$$

Equation (55) relates the rotation error in the a priori rotation (24) to state elements in the AINS estimator.

A Priori Translation Error

Equation (23) is written as follows to facilitate the perturbation analysis, $$\hat{\vec{t}}_{rs-km}^{km} = \hat{C}_e^{km}\hat{\vec{t}}_{rs-km}^{e} \tag{56}$$

$$\hat{\vec{t}}_{rs-km}^{e} = \Delta\hat{\vec{r}}_{km-u0}^{e} - \hat{C}_{u0}^{e}\hat{\vec{l}}_{u0rs}^{u0}$$

The terms in the translation (23) can be cast in terms of their erroneous versions minus their errors as, $$\vec{r}_{rm}^e = \hat{\vec{r}}_{rm}^e - \delta\vec{r}_{rm}^e \tag{57}$$

$$\vec{l}_{u0-rs}^{u0} = \hat{\vec{l}}_{u0rs}^{u0} - \delta\vec{l}_{u0-rs}^{u0}$$

$\hat{C}_w^e$ in Equation (51) is the DCM from the computed wander angle frame, also called the computer (c) frame, to the earth frame, written as $\hat{C}_w^e = C_c^e$. The modified psi-angle INS error model casts the INS position error vector in the computer frame, which can be done as follows, $$\vec{r}_{u0}^e = C_w^e \vec{r}_{u0}^w \cong C_c^e (I - (\delta\vec{\theta}_{INS} \times))(\hat{\vec{r}}_{u0}^w - \delta\vec{r}_{u0}^w), \tag{58}$$

$$\cong \hat{\vec{r}}_{u0}^e - \delta\vec{r}_{u0}^e$$

where $$\delta\vec{r}_{u0}^e = C_w^e \delta\vec{r}_{u0}^c$$

$$\delta\vec{r}_{u0}^c = \delta\vec{r}_{u0}^w - \delta\vec{\theta}_{INS} \times \hat{\vec{r}}_{u0}^w$$

Equations (51), (52), (57) and (58) can be substituted into Equation (56) to obtain:

$$\vec{t}_{rs-km}^e = \vec{r}_{km}^e - \delta\vec{r}_{km}^e - \vec{r}_{u0}^e + \hat{C}_w^e \delta\vec{r}_{u0}^c - \hat{C}_w^e$$

$$(I + (\vec{\psi}_{INS} \times))\hat{C}_{u0}^w (\hat{\vec{l}}_{u0-rs}^{u0} - \delta\vec{l}_{u0-rs}^{u0})$$

$$= \vec{\psi}_{rs-km}^e + \delta\vec{t}_{rs-km}^e,$$

where $$\delta\vec{t}_{rs-km}^e \cong \hat{C}_w^e \delta\vec{r}_{u0}^c - \delta\vec{r}_{km}^e + \hat{C}_w^e \hat{C}_{u0}^w \delta\vec{l}_{u0-rs}^{u0} +$$

$$\hat{C}_w^e (\hat{C}_{u0}^w \hat{\vec{l}}_{u0-rs}^{u0} \times)\vec{\psi}_{INS},$$

which can be then substituted into Equation (23) to obtain:

$$\vec{t}_{rs-km}^{km} = (I + (\vec{\varphi}_{km} \times))\hat{C}_e^{km}(\hat{\vec{t}}_{rs-km}^e + \delta\vec{t}_{rs-km}^e) \tag{59}$$

$$\cong \hat{C}_e^{km}(\hat{\vec{t}}_{rs-km}^e + \delta\vec{t}_{rs-km}^e) + (\vec{\varphi}_{km} \times)\hat{C}_e^{km}\hat{\vec{t}}_{rs-km}^e$$

$$= \hat{\vec{t}}_{rs-km}^{km} + \delta\vec{t}_{rs-km}^{km}$$

where $$\delta\vec{t}_{rs-km}^{km} \cong \hat{C}_e^{km} \delta\vec{t}_{rs-km}^e - (\hat{\vec{t}}_{rs-km}^{km} \times)\vec{\varphi}_{rm} \tag{60}$$

$$= \hat{C}_e^{km}(\hat{C}_w^e(\delta\vec{r}_{u0}^c + \hat{C}_{u0}^w \delta\vec{l}_{u0-rs}^{u0} +$$

$$(\hat{C}_{u0}^w \hat{\vec{l}}_{u0-rs}^{u0} \times)\vec{\psi}_{INS}) - \delta\vec{r}_{km}^e) - (\hat{\vec{t}}_{rs-km}^{km} \times)(\vec{\varphi}_{km})$$

Equation (60) relates the translation error in the a priori translation (23) to states in the AINS estimator.

Complete Measurement Model

Equations (54) and (59) substituted into Equation (1) produces a transformation:

$$T\vec{m}_i = (I + (\vec{\phi}_T \times))\hat{C}_{ri}^{km} \vec{m}_i + \hat{\vec{t}}_{rs-km}^{km} + \delta\vec{t}_{rs-km}^{km}, \tag{61}$$

$$= (I + (\vec{\phi}_T \times))\vec{p}_i + \vec{t}_T$$

$$= \tilde{T}\vec{p}_i$$

Equation (61) shows that $\tilde{T}$ given by translation vector $\vec{t}_T = \delta\vec{t}_{rs-km}^{km}$ and rotation matrix $I + (\vec{\phi}_T \times)$ describes the residual transformation following the a priori transformation (25) in terms of the elements of Equation (30). The MRCG measurement observes the non-zero registration cost gradient associated with $\tilde{T}$. Its measurement model (29) describes the registration cost gradient deviation from zero in terms of the elements of (30) that are part of the AINS estimator state vector.

C. Delta Pose Registration Cost Gradient Measurement Model

A Priori Rotation Error

The error-free rotation DCM can be written as, $$C_{ri(k-1)}^{ri(k)} = C_{u0}^{ri}(k) C_{u0(k-1)}^{u0(k)} C_{ri}^{u0}(k-1) \tag{62}$$

$$C_{u0(k-1)}^{u0(k)} = C_e^{u0}(k) C_{u0}^e(k-1) \tag{63}$$

$C_e^{u0}(j) = C_w^{u0}(j) C_e^w(j)$ for some time step j with erroneous DCMs (51) becomes $$C_e^{u0}(j) \approx \hat{C}_w^{u0}(j)(I - (\vec{\psi}_{INS}(j) \times))\hat{C}_e^w(j) \tag{64}$$

Equation (64) with j=k and its transpose with j=k−1 can be substituted into Equation (63) to obtain $$\hat{C}_{u0(k-1)}^{u0(k)} \cong \hat{C}_w^{u0}(k)(I - (\vec{\psi}_{INS}(k) \times))\hat{C}_{w(k-1)}^{w(k)}(I + \tag{65}$$

$$(\vec{\psi}_{INS}(k-1) \times))\hat{C}_{u0}^w(k-1)$$

$$\cong \hat{C}_{u0(k-1)}^{u0(k)} - \hat{C}_w^{u0}(k)\left((\vec{\psi}_{INS}(k) \times)\hat{C}_{w(k-1)}^{w(k)} -$$

$$\hat{C}_{w(k-1)}^{w(k)}(\vec{\psi}_{INS}(k-1) \times)\right)\hat{C}_{u0}^w(k-1)$$

where $\hat{C}_{w(k-1)}^{w(k)} = \hat{C}_e^w(k)\hat{C}_w^e(k-1)$.

The second term in Equation (65) with Equation (49) can be written as, $$(\vec{\psi}_{INS}(k)\times)\hat{C}_{w(k-1)}^{w(k)} - \hat{C}_{w(k-1)}^{w(k)}(\vec{\psi}_{INS}(k-1)\times) = (\Delta\vec{\psi}_{INS}(k)\times)\hat{C}_{w(k-1)}^{w(k)} \quad (66)$$

where $$\Delta\vec{\psi}_{INS}(k) \approx \vec{\psi}_{INS}(k) - \hat{C}_{w(k-1)}^{w(k)}\vec{\psi}_{INS}(k-1) \quad (67)$$

Equation (65) with Equation (66) becomes, $$C_{u0(k-1)}^{u0(k)} \cong \hat{C}_{u0(k-1)}^{u0(k)} - \hat{C}_w^{u0}(k)\left(\Delta\vec{\psi}_{INS}^{w(k)}(k)\times\right)\hat{C}_{w(k-1)}^{w(k)}\hat{C}_{u0}^w(k-1) = \left(I - \left(\hat{C}_w^{u0}(k)\Delta\vec{\psi}_{INS}(k)\times\right)\right)\hat{C}_{u0(k-1)}^{u0(k)}. \quad (68)$$

$C_{u0}^{ri}(j) = C_{rs}^{ri}(j)C_{u0}^{rs}$ for some time step j with erroneous DCMs (51) becomes, $$C_{u0}^{ri}(j) \cong (I + (\vec{\varphi}_{ri}(j)\times))\hat{C}_{rs}^{ri}(j)(I + (\vec{\varphi}_{rs}\times))\hat{C}_{u0}^{rs} \quad (69)$$
$$\cong \left(I + (\vec{\varphi}_{ri}(j)\times) + \left(\hat{C}_{rs}^{ri}(j)\vec{\varphi}_{rs}\times\right)\right)\hat{C}_{u0}^{ri}(j)$$

Equations (68) and (69) with j=k and its transpose with j=k−1 can be substituted into Equation (62) and products of perturbation terms to obtain:

$$C_{ri(k-1)}^{ri(k)} \cong \hat{C}_{ri(k-1)}^{ri(k)} \quad (70)$$
$$+ (\vec{\varphi}_{ri}(k)\times)\hat{C}_{ri(k-1)}^{ri(k)} - \hat{C}_{ri(k-1)}^{ri(k)}(\vec{\varphi}_{ri}(k-1)\times)$$
$$+ \left(\hat{C}_{rs}^{ri}(k)\vec{\varphi}_{rs}\times\right)\hat{C}_{ri(k-1)}^{ri(k)} - \hat{C}_{ri(k-1)}^{ri(k)}\left(\hat{C}_{rs}^{ri}(k-1)\vec{\varphi}_{rs}\times\right)$$
$$- \hat{C}_{u0}^{ri}(k)\left(\hat{C}_w^{u0}(k)\Delta\vec{\psi}_{INS}(k)\times\right)\hat{C}_{u0(k-1)}^{u0(k)0}\hat{C}_{ri}^{u0}(k-1)$$

The second term in Equation (70) with Equation (49) can be written as:

$$(\vec{\varphi}_{ri}(k)\times)\hat{C}_{ri(k-1)}^{ri(k)} - \hat{C}_{ri(k-1)}^{ri(k)}(\vec{\varphi}_{ri}(k-1)\times) = (\Delta\vec{\varphi}_{ri}(k)\times)\hat{C}_{ri(k-1)}^{ri(k)} \quad (71)$$

The third term in Equation (70) is, $$(\hat{C}_{rs}^{ri}(k)\vec{\varphi}_{rs}\times)\hat{C}_{ri(k-1)}^{ri(k)} - \hat{C}_{ri(k-1)}^{ri(k)}(\hat{C}_{rs}^{ri}(k-1)\vec{\varphi}_{rs}\times) = 0 \quad (72)$$

The fourth term in Equation (70) can be written as, $$\hat{C}_{u0}^{ri}(k)\left(\hat{C}_w^{u0}(k)\Delta\vec{\psi}_{INS}(k)\times\right)\hat{C}_{u0(k-1)}^{u0(k)}\hat{C}_{ri}^{u0}(k-1) = \left(\hat{C}_{u0}^{ri}(k)\hat{C}_w^{u0}(k)\Delta\vec{\psi}_{INS}(k)\times\right)\hat{C}_{u0}^{ri}(k)\hat{C}_{u0(k-1)}^{u0(k)}\hat{C}_{ri}^{u0}(k-1) \quad (73)$$
$$= \left(\hat{C}_w^{ri}(k)\Delta\vec{\psi}_{INS}(k)\times\right)\hat{C}_{ri(k-1)}^{ri(k)}$$

Equations (71), (72) and (73) can be substituted into (70) to obtain:

$$\hat{C}_{ri(k-1)}^{ri(k)} \approx (I + (\Delta\vec{\varphi}_{ri}(k)\times) - (\hat{C}_w^{ri}(k)\Delta\vec{\psi}_{INS}(k)\times))\hat{C}_{ri(k-1)}^{ri(k)} \quad (74)$$

Equation (74) is cast in terms of a single rotation error angle $\vec{\phi}_T$ so that it resembles Equation (11):

$$C_{ri(k-1)}^{ri(k)} \approx (I + (\vec{\phi}_T\times))\hat{C}_{ri(k-1)}^{ri(k)},$$

where $$\vec{\phi}_T = \Delta\vec{\varphi}_{ri}(k) - \hat{C}_w^{ri}(k)\Delta\vec{\psi}_{INS}(k) \quad (75)$$

Equation (75) relates the residual rotation following the a priori rotation (39) to state elements in the AINS estimator.

The following assumptions are used to simplify the model to obtain the measurement model stated in Equations (43) to (46). These assume that the range image sampling interval $\Delta t_k$ is short, on the order of one second or less.

A1: $\Delta\vec{\psi}_{INS}(k)\approx 0$ on the assumption that $\vec{\psi}_{INS}$ changes sufficiently slowly to make it approximately constant over one epoch. This assumes the IMU gyro errors are sufficiently small, on the order of a few degrees per hour.

A2: $\Delta\vec{\varphi}_{ri}(k)\approx\vec{\eta}_{ri}(k)$ is approximated by broadband noise and hence does not require an explicit state model.

Equation (75) with assumptions A1 and A2 reduces to a simple broadband noise model, $$\vec{\phi}_T \approx \vec{\eta}_{ri} \quad (76)$$

A Priori Translation Error

The terms in Equation (34) are evaluated individually using Equation (57) and the previous rotation error development above.

Equation (38) with Equations (52) and (66) becomes, $$\Delta C_{u0}^e(k) \cong \hat{C}_w^e(k)\left(I + (\vec{\psi}_{INS}(k)\times)\right)\hat{C}_{u0}^w(k) - \quad (77)$$
$$\hat{C}_w^e(k-1)\left(I + (\vec{\psi}_{INS}(k-1)\times)\right)\hat{C}_{u0}^w(k-1)$$
$$= \Delta\hat{C}_{u0}^e(k) + \hat{C}_{u0}^e(k)\left(\hat{C}_w^{u0}(k)\Delta\vec{\psi}_{INS}(k)\times\right)$$

Equation (37) with Equation (58) becomes, $$\Delta\vec{r}_{u0}^e(k) = \left(\hat{\vec{r}}_{u0}^e(k) - \hat{C}_w^e(k)\delta\vec{r}_{u0}^c(k)\right) - \quad (78)$$
$$\left(\hat{\vec{r}}_{u0}^e(k-1) - \hat{C}_w^e(k-1)\delta\vec{r}_{u0}^c(k-1)\right),$$
$$= \Delta\hat{\vec{r}}_{u0}^e(k) - \hat{C}_w^e(k)\Delta\delta\vec{r}_{u0}^c(k)$$

where $$\Delta\delta\vec{r}_{u0}^c(k) = \delta\vec{r}_{u0}^c(k) - C_{c(k-1)}^{c(k)}\delta\vec{r}_{u0}^c(k-1). \quad (79)$$
$$= \delta\vec{r}_{u0}^{c(k)}(k) - \delta\vec{r}_{u0}^{c(k)}(k-1)$$

Substitute Equations (77) and (78) into Equation (36) to obtain, $$\Delta\vec{t}_{u0-rs}^e(k) = \Delta\hat{\vec{r}}_{u0}^e(k) - \hat{C}_w^e(k)\Delta\delta\vec{r}_{u0}^c(k) \quad (80)$$
$$+ \left(\Delta\hat{C}_{u0}^e(k) + \hat{C}_{u0}^e(k)\left(\hat{C}_w^{u0}(k)\Delta\vec{\psi}_{INS}(k)\times\right)\right)\left(\hat{l}_{u0-rs}^{u0} + \delta\hat{l}_{u0-rs}^{u0}\right)$$
$$\cong \Delta\hat{\vec{t}}_{u0-rs}^e(k) - \delta\Delta\vec{t}_{u0-rs}^e(k)$$

where $$\delta\Delta\vec{t}_{u0-rs}^e(k) = \hat{C}_w^e(k)\Delta\delta\vec{r}_{u0}^c(k)$$
$$+ \hat{C}_{u0}^e(k)\left(\hat{l}_{u0-rs}^{u0}\times\right)\hat{C}_w^{u0}(k)\Delta\vec{\psi}_{INS}(k)$$
$$- \Delta\hat{C}_{u0}^e(k)\delta\hat{l}_{u0-rs}^{u0}$$

Equation (35) with erroneous DCMs (51) becomes, $$C_e^{ri}(k) \cong I + (\varphi_{ri}(k)\times))\hat{C}_{rs}^{ri}(k)(I + (\vec{\varphi}_{rs}\times)) \quad (81)$$
$$\hat{C}_{u0}^{rs}\hat{C}_w^{u0}(k)\left(I - (\vec{\psi}_{INS}(k)\times)\right)\hat{C}_e^w(k),$$
$$\cong \hat{C}_e^{ri}(k)(I + (\vec{\varphi}_{ri-e}(k)\times))$$

-continued where $$\vec{\varphi}^e_{ri-e}(k) = \hat{C}^e_{ri}(k)\vec{\varphi}_{ri}(k) + \hat{C}^e_{rs}(k)\vec{\varphi}_{rs} - \hat{C}^e_w(k)\vec{\psi}_{INS}(k).$$

Substitute Equations (80) and (81) into Equation (34) to obtain, $$\vec{t}^{ri(k)}_{rs(k-1)-rs(k)} = \hat{C}^e_{ri}(k)(I + (\vec{\varphi}^e_{ri-e}(k)\times))\left(\Delta\hat{\vec{t}}^e_{u0-rs}(k)\right) - \delta\Delta\vec{t}^e_{u0-rs}, \quad (82)$$

$$\cong \hat{\vec{t}}^{ri(k)}_{rs(k-1)-rs(k)} - \delta\vec{t}^{ri(k)}_{rs(k-1)-rs(k)}$$

where the translation error to be estimated is, $$\delta\vec{t}^{ri(k)}_{rs(k-1)-rs(k)} = \hat{C}^e_{ri}(k)\left(\Delta\hat{\vec{t}}^e_{u0-rs}(k)\times\right)\vec{\varphi}^e_{ri-e}(k) + \hat{C}^e_{ri}(k)\delta\Delta\vec{t}^e_{u0-rs}(k)\,,\quad(83)$$

$$= \left(\Delta\hat{\vec{t}}^{ri}_{u0-rs}(k)\times\right)\left(\vec{\varphi}_{ri}(k) + \hat{C}^{ri}_{rs}(k)\vec{\varphi}_{rs} - \hat{C}^{ri}_w(k)\vec{\psi}_{INS}(k)\right)$$

$$+ \hat{C}^{ri}_w(k)\Delta\delta\vec{r}^c_{u0}(k)$$

$$+ \hat{C}^{ri}_{u0}(k)\left(\hat{\vec{t}}^{u0}_{u0-rs}\times\right)\hat{C}^{u0}_w(k)\Delta\vec{\psi}_{INS}(k)$$

$$- \hat{C}^e_{ri}(k)\hat{C}^e_{u0}(k)\delta\vec{t}^{u0}_{u0-rs}$$

where $$\Delta\hat{\vec{t}}^{ri}_{u0-rs}(k) = \hat{C}^{ri}_e(k)\Delta\hat{\vec{t}}^e_{u0-rs}(k).$$

The following assumption in additions to assumptions A1 and A2 are used to simplify the model to obtain the measurement model stated in Equations (43) to (46). These assume that the range image sampling interval $\Delta t_k$ is short, on the order of one second or less.

A3: $\Delta\delta\vec{r}^c_{u0}(k) \approx \delta\vec{v}^c_{u0}(k)\Delta t_k$ describes the change in INS position error as an approximate numerical integral of the INS velocity error $\delta\vec{v}^c_{u0}(k)$ resolved in the computer frame in the psi-angle error model (see B. M. Scherzinger and D. B. Reid, Modified inertial navigator error models, Proceedings of PLANS 1994).

Equation (83) with assumptions A1, A2 and A3 reduces to, $$\delta\vec{t}^{ri(k)}_{rs(k-1)-rs(k)} = \left(\Delta\hat{\vec{t}}^{ri}_{u0-rs}(k)\times\right)\left(\vec{\varphi}_{ri}(k) + \hat{C}^{ri}_{rs}(k)\vec{\varphi}_{rs} - \hat{C}^{ri}_w(k)\vec{\psi}_{INS}(k)\right). \quad (84)$$

$$+ \hat{C}^{ri}_w(k)\delta\vec{v}^c_{u0}(k)\Delta t_k$$

$$- \hat{C}^{ri}_e(k)\Delta\hat{C}^e_{u0}(k)\delta\vec{t}^{u0}_{u0-rs}$$

Complete Measurement Model

Equations (74) and (82) substituted into Equation (1) produces a transformation, $$T\vec{m}_i(k-1) = \left(I + (\vec{\phi}_T\times)\right)\hat{C}^{ri(k)}_{ri(k-1)}\vec{m}_i(k-1) + \hat{\vec{t}}^{ri(k)}_{rs(k-1)-rs(k)} - \delta\vec{t}^{ri(k)}_{rs(k-1)-rs(k)} \quad (85)$$

$$= \left(I + (\vec{\phi}_T\times)\right)\vec{p}_i + \vec{t}_{\tilde{T}}$$

$$= \tilde{T}\vec{p}_i$$

Equation (85) shows that $\tilde{T}$ comprising translation vector $\vec{r}_{\tilde{T}} = -\delta\vec{r}^{ri(k)}_{rs(k-1)-rs(k)}$ given by (84) and rotation matrix I+($\vec{\phi}_T\times$) with $\vec{\phi}_T$ given by (76) describes the residual transformation following the a priori transformation (40) in terms of the linear measurement model stated in Equations (43) to (46).

It is also understood that the examples and embodiments described herein are for illustrative purposes only and that various modifications or changes in light thereof will be suggested to persons skilled in the art and are to be included within the spirit and purview of this application and scope of the appended claims.

The invention claimed is:

1. A navigation system comprising:
an inertial measurement unit (IMU) attached to a dynamic platform and configured to measure a specific force vector and an angular rate vector of the dynamic platform;
an inertial navigation system (INS) unit coupled to the IMU, the INS unit configured to:
determine an INS solution of a position and an orientation of the dynamic platform based on at least: (i) a previous INS solution, and (ii) the specific force vector and the angular rate vector measured by the IMU;
compute a current INS solution based on the INS solution, the current INS solution being valid at a current construction time; and
compute a last INS solution based on a prior INS solution, the last INS solution being valid at a last construction time prior to the current construction time;
a range image (RI) sensor attached to the dynamic platform and configured to acquire last RI data at the last construction time and current RI data at the current construction time;
an RI data preprocessor coupled to the RI sensor and the INS unit, the RI data preprocessor configured to:
perform an a priori transformation of the last RI data using the last INS solution to obtain transformed last RI data; and
perform an a priori transformation of the current RI data using the current INS solution to obtain transformed current RI data;
an RI filter manager (RFM) coupled to the RI data preprocessor, the RFM configured to construct a delta pose registration cost gradient (DPRCG) measurement for the current construction time based on the transformed last RI data, the transformed current RI data, the last INS solution, and the current INS solution;
an aided INS (AINS) estimator coupled to the RFM and the INS unit, the AINS estimator configured to determine INS error corrections and INS solution statistics based on the DPRCG measurement, wherein the INS unit is configured to update the INS solution based on the INS error corrections; and
an output manager coupled to the INS unit and the AINS estimator, the output manager configured to determine an absolute solution of a current position and a current orientation of the dynamic platform based on the INS solution and the INS solution statistics.

2. The navigation system of claim 1, wherein computing the current INS solution comprises interpolating the INS solution for the current construction time, and computing the last INS solution comprises interpolating the prior INS solution for the last construction time.

3. The navigation system of claim 1, wherein the IMU comprises a three-axis accelerometer and a three-axis gyroscope.

4. The navigation system of claim 1, wherein the RI data comprises a point cloud.

5. The navigation system of claim 1, wherein the RI sensor comprises a lidar, a radar, or a 3D camera unit.

6. The navigation system of claim 1, further comprising:
one or more aiding data sources configured to provide aiding data; and
an AINS filter manager (AFM) coupled to the one or more aiding data sources and the INS unit, the AFM configured to determine AINS estimator data based on the aiding data and the INS solution;
wherein the AINS estimator data is input to the AINS estimator, and the AINS estimator is configured to determine the INS error corrections and the INS solution statistics further based on the AINS estimator data.

7. The navigation system of claim 6, wherein the aiding data sources comprise one or more of global navigation satellite systems (GNSS) receiver(s), a wheel odometer, a zero velocity detector, a radar, a sonar, a magnetic compass, and a magnetometer.

8. A navigation system comprising:
an inertial measurement unit (IMU) attached to a dynamic platform and configured to measure a specific force vector and an angular rate vector of the dynamic platform;
a navigation estimator coupled to the IMU and configured to estimate a current navigation solution of a position and an orientation of the dynamic platform at a current time based on at least: (i) a last navigation solution at a prior time, and (ii) the specific force vector and the angular rate vector measured by the IMU;
a range image RI sensor attached to the dynamic platform and configured to acquire current RI data at the current time and last RI data at the prior time;
an RI data preprocessor coupled to the RI sensor and the navigation estimator, the RI data preprocessor configured to:
perform an a priori transformation of the last RI data to obtain transformed last RI data based on the last navigation solution; and
perform an a priori transformation of the current RI data to obtain transformed current RI data based on the current navigation solution; and
an RI filter manager (RFM) coupled to the RI data preprocessor and the navigation estimator, the RFM configured to construct a delta pose registration cost gradient (DPRCG) measurement based on (i) the transformed last RI data, (ii) the transformed current RI data, (iii) the current navigation solution, and (iv) the last navigation solution;
wherein the navigation estimator is further configured to determine an absolute navigation solution of a current position and a current orientation of the dynamic platform based on at least (i) the current navigation solution, and (ii) the DPRCG measurement.

9. The navigation system of claim 8, wherein the IMU comprises a three-axis accelerometer and a three-axis gyroscope.

10. The navigation system of claim 8, wherein the RI data comprises a point cloud.

11. The navigation system of claim 8, wherein the RI sensor comprises a lidar, a radar, or a 3D camera unit.

12. The navigation system of claim 8, further comprising:
one or more aiding data sources configured to provide aiding data; and
an aided inertial navigation system (AINS) filter manager (AFM) coupled to the one or more aiding data sources and an inertial navigation system (INS) unit, the AFM configured to determine AINS estimator data based on the aiding data and an INS solution of the position and the orientation of the dynamic platform;
wherein the AINS estimator data is input to an AINS estimator, and the AINS estimator is configured to determine INS error corrections and INS solution statistics further based on the AINS estimator data; and
wherein the one or more aiding data sources comprise one or more of global navigation satellite systems (GNSS) receiver(s), a wheel odometer, a zero velocity detector, a radar, a sonar, a magnetic compass, and a magnetometer.

13. A method of navigation comprising:
measuring, using an inertial measurement unit (IMU) attached to a dynamic platform, a specific force vector and an angular rate vector of the dynamic platform;
determining an inertial navigation system (INS) solution of a current position and a current orientation of the dynamic platform based on at least: (i) a previous solution, and (ii) the specific force vector and the angular rate vector measured by the IMU;
computing a current INS solution based on the INS solution, the current INS solution being valid at a current construction time;
computing a last INS solution based on a prior INS solution, the last INS solution being valid at a last construction time prior to the current construction time;
acquiring, using a range image (RI) sensor attached to the dynamic platform, last RI data at the last construction time and current RI data at the current construction time;
performing an a priori transformation of the last RI data using the last INS solution to obtain transformed last RI data;
performing an a priori transformation of the current RI data using the current INS solution to obtain transformed current RI data;
constructing a delta pose registration cost gradient (DPRCG) measurement for the current construction time based on the transformed last RI data, the transformed current RI data, the last INS solution, and the current INS solution;
determining INS error corrections and INS solution statistics based on the DPRCG measurement;
updating the INS solution based on the INS error corrections; and
determining an absolute solution of the current position and the current orientation of the dynamic platform based on the INS solution and the INS solution statistics.

14. The method of claim 13, wherein computing the current INS solution comprises interpolating the INS solution for the current construction time, and computing the last INS solution comprises interpolating the prior INS solution for the last construction time.

15. The method of claim 13, wherein the IMU comprises a three-axis accelerometer and a three-axis gyroscope.

16. The method of claim 13, wherein the RI data comprises a point cloud.

17. The method of claim 13, wherein the RI sensor comprises a lidar, a radar, or a 3D camera unit.

18. The method of claim 13, further comprising:
acquiring aiding data using one or more aiding data sources; and
determining aided INS (AINS) estimator data based on the aiding data and the INS solution;

wherein determining the INS error corrections and the INS solution statistics is further based on the AINS estimator data.

19. The method of claim 18, wherein the one or more aiding data sources comprise one or more of global navigation satellite systems (GNSS) receiver(s), a wheel odometer, a zero velocity detector, a radar, a sonar, a magnetic compass, and a magnetometer.

20. The method of claim 13, wherein:
measuring the specific force vector and the angular rate vector of the dynamic platform is performed at a first rate; and
determining the INS error corrections and the INS solution statistics is performed at a second rate slower than the first rate.

* * * * *